(12) United States Patent
Singer

(10) Patent No.: US 12,223,545 B2
(45) Date of Patent: *Feb. 11, 2025

(54) DYNAMIC STRATEGY MANAGEMENT TOOL

(71) Applicant: TRADING TECHNOLOGIES INTERNATIONAL INC., Chicago, IL (US)

(72) Inventor: Scott F. Singer, Green Oaks, IL (US)

(73) Assignee: Trading Technologies International, Inc., Chicago, IL (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/408,919

(22) Filed: Jan. 10, 2024

(65) Prior Publication Data

US 2024/0144367 A1     May 2, 2024

Related U.S. Application Data

(63) Continuation of application No. 18/063,872, filed on Dec. 9, 2022, now Pat. No. 11,922,502, which is a
(Continued)

(51) Int. Cl.
*G06Q 40/04* (2012.01)
(52) U.S. Cl.
CPC ................................ *G06Q 40/04* (2013.01)
(58) Field of Classification Search
CPC .................................................. G06Q 40/04
See application file for complete search history.

(56) References Cited

U.S. PATENT DOCUMENTS

| 7,401,042 B1 | 7/2008 | Pisani |
| 8,185,467 B2 | 5/2012 | Friesen et al. |

(Continued)

FOREIGN PATENT DOCUMENTS

| AU | 2013205641 A1 | * | 11/2013 | ............. G06Q 40/04 |
| CA | 2632973 A1 | * | 7/2007 | ............. G06Q 40/00 |

(Continued)

OTHER PUBLICATIONS

Visual Development Platform for White-Box Algorithmic Trading (Year: 2010).*

(Continued)

*Primary Examiner* — Bennett M Sigmond
*Assistant Examiner* — James H Miller
(74) *Attorney, Agent, or Firm* — McDonnell Boehnen Hulbert & Berghoff LLP

(57) ABSTRACT

Example methods, apparatus, and computer readable storage media are described and disclosed. An example method includes depicting a strategy node in a graphical user interface presented by a computing device. The strategy node represents a trading strategy associated with two or more tradeable objects. The example method includes generating a graphical connector between the strategy node and one of a plurality of contract nodes including at least a first contract node and a second contract node. Each contract node represents a contract associated with one of the tradeable objects. The example method includes repositioning, in response to an input received via the graphical interface, an endpoint of the graphical connector from the first contract node specified by the trading strategy to the second contract node. The example method also includes generating an updated trading strategy based on the trading strategy and the second contract node.

14 Claims, 13 Drawing Sheets

Related U.S. Application Data continuation of application No. 17/460,107, filed on Aug. 27, 2021, now Pat. No. 11,551,301, which is a continuation of application No. 16/990,637, filed on Aug. 11, 2020, now Pat. No. 11,138,665, which is a continuation of application No. 14/664,169, filed on Mar. 20, 2015, now Pat. No. 10,776,868.

(56) References Cited

U.S. PATENT DOCUMENTS

| | | | | |
|---|---|---|---|---|
| 8,266,030 | B2 * | 9/2012 | Milne | G06Q 40/04 |
| | | | | 705/37 |
| 8,682,773 | B1 | 3/2014 | Murphy et al. | |
| 9,727,914 | B2 | 8/2017 | Potekhina et al. | |
| 10,776,868 | B2 * | 9/2020 | Singer | G06Q 40/04 |
| 11,138,665 | B2 * | 10/2021 | Singer | G06Q 40/04 |
| 11,551,301 | B2 * | 1/2023 | Singer | G06Q 40/04 |
| 2007/0076002 | A1 | 4/2007 | Heaton | |
| 2009/0327153 | A1 * | 12/2009 | Milne | G06F 8/10 |
| | | | | 705/36 R |
| 2010/0211525 | A1 * | 8/2010 | West | G06Q 40/00 |
| | | | | 715/769 |
| 2013/0132257 | A1 * | 5/2013 | Zagara | G06Q 40/04 |
| | | | | 705/37 |
| 2014/0095365 | A1 * | 4/2014 | Potekhina | G06Q 40/04 |
| | | | | 705/37 |
| 2016/0048916 | A1 | 2/2016 | Glodjo et al. | |
| 2016/0062586 | A1 * | 3/2016 | Müller | G06F 3/0488 |
| | | | | 715/769 |
| 2016/0132966 | A1 | 5/2016 | Creamer | |
| 2016/0275607 | A1 | 9/2016 | Singer | |
| 2017/0301021 | A1 | 10/2017 | Potekhina et al. | |
| 2020/0372579 | A1 | 11/2020 | Singer | |

FOREIGN PATENT DOCUMENTS

| | | | | |
|---|---|---|---|---|
| JP | 2009187569 A | * | 8/2009 | G06F 3/04847 |
| JP | 2009535713 A | * | 10/2009 | G06Q 40/00 |
| JP | 2013536496 A | | 9/2013 | |
| WO | WO-2006102286 A2 | * | 9/2006 | G06Q 40/02 |
| WO | WO-2007046884 A2 | * | 4/2007 | G06Q 40/04 |
| WO | WO-2011034712 A1 | * | 3/2011 | G06Q 40/04 |

OTHER PUBLICATIONS

Chou, et al., "Visual Development Platform for White-Box Algorithmic Trading," Sixth International Conference on Intelligent Information Hiding and Multimedia Signal Processing, IEEE, 2010, pp. 712-715.

Wing, et al. "A CASE for Electronic Documentary Dossier," CRC for Distributed Systems Technology, Department of Computer Science, The University of Queensland, Australia. (Year: : 1996).

* cited by examiner

DYNAMIC STRATEGY MANAGEMENT TOOL

CROSS REFERENCE TO RELATED APPLICATIONS

This patent application is a continuation of U.S. patent application Ser. No. 18/063,872, filed Dec. 9, 2022, now U.S. Pat. No. 11,922,502, which is a continuation of U.S. patent application Ser. No. 17/460,107, filed Aug. 27, 2021, now U.S. Pat. No. 11,551,301, which is a continuation of U.S. patent application Ser. No. 16/990,637, filed Aug. 11, 2020, now U.S. Pat. No. 11,138,665, which is a continuation of U.S. patent application Ser. No. 14/664,169, filed Mar. 20, 2015, now U.S. Pat. No. 10,776,868, the contents of each of which are hereby incorporated by reference for all purposes.

BACKGROUND

An electronic trading system generally includes a trading device in communication with an electronic exchange. The trading device receives information about a market, such as prices and quantities, from the electronic exchange. The electronic exchange receives messages, such as messages related to orders, from the trading device. The electronic exchange attempts to match quantity of an order with quantity of one or more contra-side orders.

The trading device may provide a trading interface to enable a user to monitor the information about the market and execute trades via the electronic exchange. Some trading interfaces list prices, bid quantities and/or ask quantities of a tradeable object to enable the user to determine a market depth of the tradeable object.

BRIEF DESCRIPTION OF THE FIGURES

Certain embodiments are disclosed with reference to the following drawings.

Figure 1:
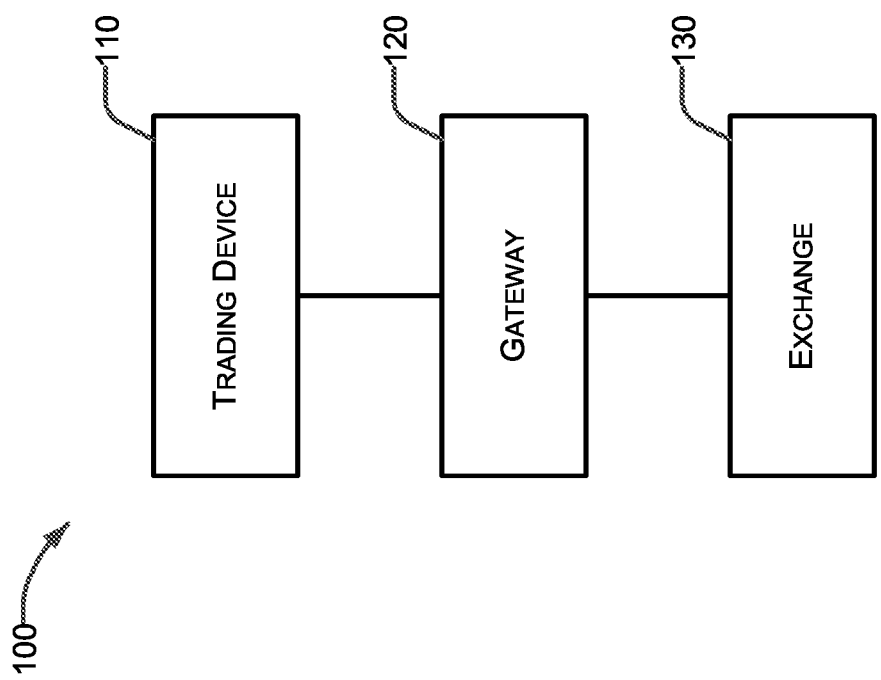
FIG. 1 illustrates a block diagram representative of an example electronic trading system in which certain embodiments may be employed.

Certain embodiments will be better understood when read in conjunction with the provided figures, which illustrate examples. It should be understood, however, that the embodiments are not limited to the arrangements and instrumentality shown in the attached figures.

DETAILED DESCRIPTION

This disclosure relates generally to electronic trading environments and, more particularly, to systems and methods to visualize and manage a format and terms of one or more trading strategies. For example, disclosed systems and methods present and visually organize elements or legs of a trading strategy to allow a trader to graphically manipulate one or more elements or legs for one or more tradeable objects in the trading strategy.

Trading devices are used to monitor a market for a tradeable object, execute trades of the tradeable object and/or perform other actions via an electronic exchange. The electronic exchange communicates market data to the trading device, and the trading device stores, organizes, analyzes and/or displays the market data. As the tradeable object is traded on the market, the price of the tradeable object may move (e.g., increase, decrease, fluctuate, etc.).

Certain examples provide a graphical representation (e.g., a spread graph) of a configuration of a trading strategy such as a spread. A spread graph depicts different elements of the trading strategy as graphical elements linked via flexible connectors (e.g., visual lines provided as part of the graphical representation and moveable with respect to the graphical elements, etc.). For example, a trading strategy may be depicted as a strategy node (e.g., a circle, oval, etc.) that identifies the specific spread in operation at a trading device. Another element may be a tradeable object cooperating with one or more contract nodes. Each contract node, in turn, identifies a contract having a defined expiration date (e.g., the time and date that the contract stops trading or ceases to be available). Flexible connectors can be defined between the strategy node and each contract node as specified by the trading strategy. Each connector has two end points that are used (e.g., placed, positioned, moved, etc.) to associate the connector with the strategy node and a contract node. Multiple connectors from multiple trading strategies may be directed to the same contract node.

In operation, end points of each of the multiple connectors can be selected and repositioned from a first contract node to a second contract node. Movement between first and second contract nodes represents a contract roll (e.g., a shift or extension of a trading strategy configuration from one contract to another contract) such that each end point associated with the first contract node (e.g., a tradable object associated with the contract node, such as a contract with a termination or expiration date, ending event, etc.) is reassigned to the second contract node. In response to the reassignment of connector end point(s), the trading strategy configuration is updated, and updated parameters (e.g., new contract expiration date, new contract type, etc.) for the trading strategy are communicated to the trading device for execution.

For example, a configured tradeable object may be a contract that has an expiration date. The tradeable object can be reconfigured to roll or shift from the current contract to another contract having a different expiration date (e.g., from a first expiration month to a second expiration month). Thus, a configuration of a tradeable object can be adjusted to include another contract by closing the initial soon-to-expire contract and opening a contract having a more distant expiration date for the same underlying tradeable object. The roll to a contract having a more distant expiration date (e.g., next month) maintains the tradeable object beyond the expiration of the initial contract and is typically executed before the expiration of the initial soon-to-expire contract, for example. For example, changing or otherwise reconfiguring one or more legs of a spread trading strategy from a contract expiring sooner to a contract expiring later represents a roll of the contracts. In other examples, a trading strategy can roll from a first contract of a first type to a second contract of a second type regardless of contract expiration date (e.g., the closing date, expiry date).

A contract roll may be further achieved by selecting the element representing the tradeable object. Selection (e.g., a click or double click, drag and drop, etc.) of the tradeable object element can cause all of the trading strategies connected to the element via the flexible connector to shift or roll to the next contract node and contract expiration date. In this way, the movement of the flexible connectors between individual graphical elements may be utilized to redefine the trading strategy.

Although this description discloses embodiments including, among other components, software executed on hardware, it should be noted that the embodiments are merely illustrative and should not be considered as limiting. For example, it is contemplated that any or all of these hardware and software components may be embodied exclusively in hardware, exclusively in software, exclusively in firmware, or in any combination of hardware, software, and/or firmware. Accordingly, certain embodiments may be implemented in other ways.

Additionally, while some examples described herein may refer to functions performed by one or more given actors such as "users" and/or other entities, it should be understood that this is for purposes of explanation only. The claims should not be interpreted to require action by any such example actor unless explicitly required by the language of the claims themselves.

I. Brief Description of Certain Embodiments

Certain embodiments provide a method. The example method includes depicting a strategy node in a graphical user interface presented by a computing device. In the example method, the strategy node represents a trading strategy associated with two or more tradeable objects. The example method includes generating, by the computing device, a graphical connector between the strategy node and one of a plurality of contract nodes including at least a first contract node and a second contract node. In the example method, each contract node represents a contract associated with one of the tradeable objects. The example method includes repositioning, in response to an input received via the graphical interface, an end point of the graphical connector from the first contract node specified by the trading strategy to the second contract node. The example method also includes generating, by the computing device, an updated trading strategy based on the trading strategy and the second contract node.

Certain embodiments provide a tangible computer readable storage medium including instructions. The example instructions, when executed, cause a computing device to at least depict a strategy node in a graphical user interface presented by the computing device. The example strategy node represents a trading strategy associated with two or more tradeable objects. The example instructions, when executed, cause the computing device to at least generate, by the computing device, a graphical connector between the strategy node and one of a plurality of contract nodes including at least a first contract node and a second contract node. In the example, each contract node represents a contract associated with one of the tradeable objects. The example instructions, when executed, cause the computing device to at least reposition, in response to an input received via the graphical interface, an end point of the graphical connector from the first contract node specified by the trading strategy to the second contract node. The example instructions, when executed, cause the computing device to at least generate, by the computing device, an updated trading strategy based on the trading strategy and the second contract node.

Certain embodiments provide a method. The example method includes determining, by a computing device, a trading strategy involving at least two tradeable objects. The example method includes determining, by the computing device, a first contract associated with a first tradeable object of the at least two tradeable objects and a second contract associated with a second tradeable object of the at least two tradeable objects, wherein each contract is associated with an expiration date. The example method includes displaying, by the computing device, a strategy graph in a graphical user interface.

The example strategy graph includes a strategy node identifying the trading strategy determined by the computing device. The example strategy graph also includes at least first and second contract nodes identifying the at least first and second contracts. The example strategy graph also includes one or more strategy leg connectors, each strategy leg connector arranged to visually connect the strategy node to one of the plurality of contract nodes. In the example strategy graph, the plurality of strategy leg connectors includes a first strategy leg connector connecting the trading strategy to the first contract node. The first strategy leg connector is movable from the first contract node to connect the trading strategy to the second contract node such that the first strategy leg connector is connected to one of the first contract node and the second contract node at a given time.

The example method also includes updating the trading strategy based on an adjustment of the strategy graph from the first strategy leg connector connecting the strategy node to the first contract node to the second strategy leg connector connecting the strategy node to the second contract node.

II. Example Electronic Trading System

FIG. 1 illustrates a block diagram representative of an example electronic trading system 100 in which certain embodiments may be employed. The system 100 includes a trading device 110, a gateway 120, and an exchange 130. The trading device 110 is in communication with the gateway 120. The gateway 120 is in communication with the exchange 130. As used herein, the phrase "in communication with" encompasses direct communication and/or indirect communication through one or more intermediary components. The exemplary electronic trading system 100 depicted in FIG. 1 may be in communication with additional components, subsystems, and elements to provide additional functionality and capabilities without departing from the teaching and disclosure provided herein.

In operation, the trading device 110 may receive market data from the exchange 130 through the gateway 120. A user may utilize the trading device 110 to monitor this market data and/or base a decision to send an order message to buy or sell one or more tradeable objects to the exchange 130.

Market data may include data about a market for a tradeable object. For example, market data may include the inside market, market depth, last traded price ("LTP"), a last traded quantity ("LTQ"), or a combination thereof. The inside market refers to the highest available bid price (best bid) and the lowest available ask price (best ask or best offer) in the market for the tradeable object at a particular point in time (since the inside market may vary over time). Market depth refers to quantities available at price levels including the inside market and away from the inside market. Market depth may have "gaps" due to prices with no quantity based on orders in the market.

The price levels associated with the inside market and market depth can be provided as value levels which can encompass prices as well as derived and/or calculated representations of value. For example, value levels may be displayed as net change from an opening price. As another example, value levels may be provided as a value calculated from prices in two other markets. In another example, value levels may include consolidated price levels.

A tradeable object is anything that may be traded. For example, a certain quantity of the tradeable object may be bought or sold for a particular price. A tradeable object may include, for example, financial products, stocks, options, bonds, future contracts, currency, warrants, funds derivatives, securities, commodities, swaps, interest rate products, index-based products, traded events, goods, or a combination thereof. A tradeable object may include a product listed and/or administered by an exchange, a product defined by the user, a combination of real or synthetic products, or a combination thereof. There may be a synthetic tradeable object that corresponds and/or is similar to a real tradeable object.

An order message is a message that includes a trade order. A trade order may be, for example, a command to place an order to buy or sell a tradeable object; a command to initiate managing orders according to a defined trading strategy; a command to change, modify, or cancel an order; an instruction to an electronic exchange relating to an order; or a combination thereof.

The trading device 110 may include one or more electronic computing platforms. For example, the trading device 110 may include a desktop computer, hand-held device, laptop, server, a portable computing device, a trading terminal, an embedded trading system, a workstation, an algorithmic trading system such as a "black box" or "grey box" system, cluster of computers, or a combination thereof. As another example, the trading device 110 may include a single or multi-core processor in communication with a memory or other storage medium configured to accessibly store one or more computer programs, applications, libraries, computer readable instructions, and the like, for execution by the processor.

As used herein, the phrases "configured to" and "adapted to" encompass that an element, structure, or device has been modified, arranged, changed, or varied to perform a specific function or for a specific purpose.

By way of example, the trading device 110 may be implemented as a personal computer running a copy of X_TRADER®, an electronic trading platform provided by Trading Technologies International, Inc. of Chicago, Illinois ("Trading Technologies"). As another example, the trading device 110 may be a server running a trading application providing automated trading tools such as ADL®, AUTOSPREADER®, and/or AUTOTRADER™, also provided by Trading Technologies. In yet another example, the trading device 110 may include a trading terminal in communication with a server, where collectively the trading terminal and the server are the trading device 110.

The trading device 110 is generally owned, operated, controlled, programmed, configured, or otherwise used by a user. As used herein, the phrase "user" may include, but is not limited to, a human (for example, a trader), trading group (for example, a group of traders), or an electronic trading device (for example, an algorithmic trading system). One or more users may be involved in the ownership, operation, control, programming, configuration, or other use, for example.

The trading device 110 may include one or more trading applications. As used herein, a trading application is an application that facilitates or improves electronic trading. A trading application provides one or more electronic trading tools. For example, a trading application stored by a trading device maybe executed to arrange and display market data in one or more trading windows. In another example, a trading application may include an automated spread trading application providing spread trading tools. In yet another example, a trading application may include an algorithmic trading application that automatically processes an algorithm and performs certain actions, such as placing an order, modifying an existing order, deleting an order. In yet another example, a trading application may provide one or more trading screens. A trading screen may provide one or more trading tools that allow interaction with one or more markets. For example, a trading tool may allow a user to obtain and view market data, set order entry parameters, submit order messages to an exchange, deploy trading algorithms, and/or monitor positions while implementing various trading strategies. The electronic trading tools provided by the trading application may always be available or may be available only in certain configurations or operating modes of the trading application.

A trading application may be implemented utilizing computer readable instructions that are stored in a computer readable medium and executable by a processor. A computer readable medium may include various types of volatile and non-volatile storage media, including, for example, random access memory, read-only memory, programmable read-only memory, electrically programmable read-only memory, electrically erasable read-only memory, flash memory, any combination thereof, or any other tangible data storage device. As used herein, the term non-transitory or tangible computer readable medium is expressly defined to include any type of computer readable storage media and to exclude propagating signals.

One or more components or modules of a trading application may be loaded into the computer readable medium of the trading device 110 from another computer readable medium. For example, the trading application (or updates to the trading application) may be stored by a manufacturer, developer, or publisher on one or more CDs or DVDs, which are then loaded onto the trading device 110 or to a server from which the trading device 110 retrieves the trading application. As another example, the trading device 110 may receive the trading application (or updates to the trading application) from a server, for example, via the Internet or an internal network. The trading device 110 may receive the trading application or updates when requested by the trading device 110 (for example, "pull distribution") and/or un-requested by the trading device 110 (for example, "push distribution").

The trading device 110 may be adapted to send order messages. For example, the order messages may be sent to through the gateway 120 to the exchange 130. As another example, the trading device 110 may be adapted to send order messages to a simulated exchange in a simulation environment which does not effectuate real-world trades.

The order messages may be sent at the request of a user. For example, a trader may utilize the trading device 110 to send an order message or manually input one or more parameters for a trade order (for example, an order price and/or quantity). As another example, an automated trading tool provided by a trading application may calculate one or more parameters for a trade order and automatically send the order message. In some instances, an automated trading tool may prepare the order message to be sent but not actually send it without confirmation from a user.

An order message may be sent in one or more data packets or through a shared memory system. For example, an order message may be sent from the trading device 110 to the exchange 130 through the gateway 120. The trading device 110 may communicate with the gateway 120 using a local area network, a wide area network, a wireless network, a virtual private network, a cellular network, a peer-to-peer network, a T1 line, a T3 line, an integrated services digital network ("ISDN") line, a point-of-presence, the Internet, a shared memory system and/or a proprietary network such as TTNET™ provided by Trading Technologies, for example.

The gateway 120 may include one or more electronic computing platforms. For example, the gateway 120 may be implemented as one or more desktop computer, hand-held device, laptop, server, a portable computing device, a trading terminal, an embedded trading system, workstation with a single or multi-core processor, an algorithmic trading system such as a "black box" or "grey box" system, cluster of computers, or any combination thereof.

The gateway 120 may facilitate communication. For example, the gateway 120 may perform protocol translation for data communicated between the trading device 110 and the exchange 130. The gateway 120 may process an order message received from the trading device 110 into a data format understood by the exchange 130, for example. Similarly, the gateway 120 may transform market data in an exchange-specific format received from the exchange 130 into a format understood by the trading device 110, for example.

The gateway 120 may include a trading application, similar to the trading applications discussed above, that facilitates or improves electronic trading. For example, the gateway 120 may include a trading application that tracks orders from the trading device 110 and updates the status of the order based on fill confirmations received from the exchange 130. As another example, the gateway 120 may include a trading application that coalesces market data from the exchange 130 and provides it to the trading device 110. In yet another example, the gateway 120 may include a trading application that provides risk processing, calculates implieds, handles order processing, handles market data processing, or a combination thereof.

In certain embodiments, the gateway 120 communicates with the exchange 130 using a local area network, a wide area network, a wireless network, a virtual private network, a cellular network, a peer-to-peer network, a T1 line, a T3 line, an ISDN line, a point-of-presence, the Internet, a shared memory system, and/or a proprietary network such as TTNET™ provided by Trading Technologies, for example.

The exchange 130 may be owned, operated, controlled, or used by an exchange entity. Example exchange entities include the CME Group, the London International Financial Futures and Options Exchange, the Intercontinental Exchange, and Eurex. The exchange 130 may include an electronic matching system, such as a computer, server, or other computing device, which is adapted to allow tradeable objects, for example, offered for trading by the exchange, to be bought and sold. The exchange 130 may include separate entities, some of which list and/or administer tradeable objects and others which receive and match orders, for example. The exchange 130 may include an electronic communication network ("ECN"), for example.

The exchange 130 may be an electronic exchange. The exchange 130 is adapted to receive order messages and match contra-side trade orders to buy and sell tradeable objects. Unmatched trade orders may be listed for trading by the exchange 130. Once an order to buy or sell a tradeable object is received and confirmed by the exchange, the order is considered to be a working order until it is filled or cancelled. If only a portion of the quantity of the order is matched, then the partially filled order remains a working order. The trade orders may include trade orders received from the trading device 110 or other devices in communication with the exchange 130, for example. For example, typically the exchange 130 will be in communication with a variety of other trading devices (which may be similar to trading device 110) which also provide trade orders to be matched.

The exchange 130 is adapted to provide market data. Market data may be provided in one or more messages or data packets or through a shared memory system. For example, the exchange 130 may publish a data feed to subscribing devices, such as the trading device 110 or gateway 120. The data feed may include market data.

The system 100 may include additional, different, or fewer components. For example, the system 100 may include multiple trading devices, gateways, and/or exchanges. In another example, the system 100 may include other communication devices, such as middleware, firewalls, hubs, switches, routers, servers, exchange-specific communication equipment, modems, security managers, and/or encryption/decryption devices.

III. Expanded Example Electronic Trading System

Figure 2:
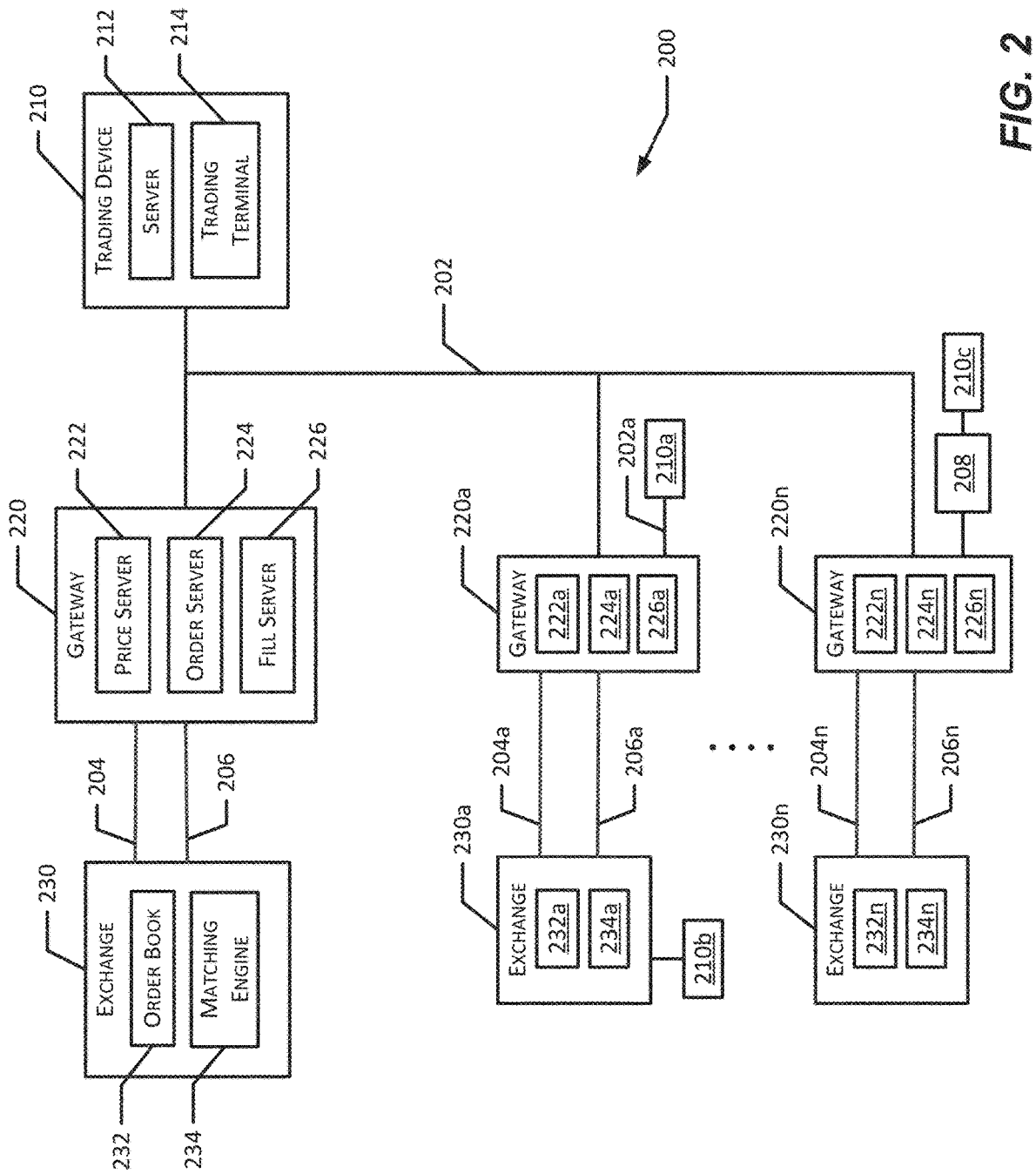
FIG. 2 illustrates a block diagram of another example electronic trading system in which certain embodiments may be employed.

FIG. 2 illustrates a block diagram of another example electronic trading system 200 in which certain embodiments may be employed. In this example, a trading device 210 may utilize one or more communication networks to communicate with a gateway 220 and exchange 230. For example, the trading device 210 utilizes network 202 to communicate with the gateway 220, and the gateway 220, in turn, utilizes the networks 204 and 206 to communicate with the exchange 230. As used herein, a network facilitates or enables communication between computing devices such as the trading device 210, the gateway 220, and the exchange 230.

The following discussion generally focuses on the trading device 210, gateway 220, and the exchange 230. However, the trading device 210 may also be connected to and communicate with "n" additional gateways (individually identified as gateways 220a-220n, which may be similar to gateway 220) and "n" additional exchanges (individually identified as exchanges 230a-230n, which may be similar to exchange 230) by way of the network 202 (or other similar networks). Additional networks (individually identified as networks 204a-204n and 206a-206n, which may be similar to networks 204 and 206, respectively) may be utilized for communications between the additional gateways and exchanges. The communication between the trading device 210 and each of the additional exchanges 230a-230n need not be the same as the communication between the trading device 210 and exchange 230. Generally, each exchange has its own preferred techniques and/or formats for communicating with a trading device, a gateway, the user, or another exchange. It should be understood that there is not necessarily a one-to-one mapping between gateways 220a-220n and exchanges 230a-230n. For example, a particular gateway may be in communication with more than one exchange. As another example, more than one gateway may be in communication with the same exchange. Such an arrangement may, for example, allow one or more trading devices 210 to trade at more than one exchange (and/or provide redundant connections to multiple exchanges).

Additional trading devices 210a-210n, which may be similar to trading device 210, may be connected to one or more of the gateways 220a-220n and exchanges 230a-230n. For example, the trading device 210a may communicate with the exchange 230a via the gateway 220a and the networks 202a, 204a and 206a. In another example, the trading device 210b may be in direct communication with exchange 230a. In another example, trading device 210c may be in communication with the gateway 220n via an intermediate device 208 such as a proxy, remote host, or WAN router.

The trading device 210, which may be similar to the trading device 110 in FIG. 1, includes a server 212 in communication with a trading terminal 214. The server 212 may be located geographically closer to the gateway 220 than the trading terminal 214 in order to reduce latency. In operation, the trading terminal 214 may provide a trading screen to a user and communicate commands to the server 212 for further processing. For example, a trading algorithm may be deployed to the server 212 for execution based on market data. The server 212 may execute the trading algorithm without further input from the user. In another example, the server 212 may include a trading application providing automated trading tools and communicate back to the trading terminal 214. The trading device 210 may include additional, different, or fewer components.

In operation, the network 202 may be a multicast network configured to allow the trading device 210 to communicate with the gateway 220. Data on the network 202 may be logically separated by subject such as, for example, by prices, orders, or fills. As a result, the server 212 and trading terminal 214 can subscribe to and receive data such as, for example, data relating to prices, orders, or fills, depending on their individual needs.

The gateway 220, which may be similar to the gateway 120 of FIG. 1, may include a price server 222, order server 224, and fill server 226. The gateway 220 may include additional, different, or fewer components. The price server 222 may process price data. Price data includes data related to a market for one or more tradeable objects. The order server 224 processes order data. Order data is data related to a user's trade orders. For example, order data may include order messages, confirmation messages, or other types of messages. The fill server collects and provides fill data. Fill data includes data relating to one or more fills of trade orders. For example, the fill server 226 may provide a record of trade orders, which have been routed through the order server 224, that have and have not been filled. The servers 222, 224, and 226 may run on the same machine or separate machines. There may be more than one instance of the price server 222, the order server 224, and/or the fill server 226 for gateway 220. In certain embodiments, the additional gateways 220a-220n may each includes instances of the servers 222, 224, and 226 (individually identified as servers 222a-222n, 224a-224n, and 226a-226n).

The gateway 220 may communicate with the exchange 230 using one or more communication networks. For example, as shown in FIG. 2, there may be two communication networks connecting the gateway 220 and the exchange 230. The network 204 may be used to communicate market data to the price server 222. In some instances, the exchange 230 may include this data in a data feed that is published to subscribing devices. The network 206 may be used to communicate order data to the order server 224 and the fill server 226. The network 206 may also be used to communicate order data from the order server 224 to the exchange 230.

The exchange 230, which may be similar to the exchange 130 of FIG. 1, includes an order book 232 and a matching engine 234. The exchange 230 may include additional, different, or fewer components. The order book 232 is a database that includes data relating to unmatched trade orders that have been submitted to the exchange 230. For example, the order book 232 may include data relating to a market for a tradeable object, such as the inside market, market depth at various price levels, the last traded price, and the last traded quantity. The matching engine 234 may match contra-side bids and offers pending in the order book 232. For example, the matching engine 234 may execute one or more matching algorithms that match contra-side bids and offers. A sell order is contra-side to a buy order. Similarly, a buy order is contra-side to a sell order. A matching algorithm may match contra-side bids and offers at the same price, for example. In certain embodiments, the additional exchanges 230a-230n may each include order books and matching engines (individually identified as the order book 232a-232n and the matching engine 234a-234n, which may be similar to the order book 232 and the matching engine 234, respectively). Different exchanges may use different data structures and algorithms for tracking data related to orders and matching orders.

In operation, the exchange 230 may provide price data from the order book 232 to the price server 222 and order data and/or fill data from the matching engine 234 to the order server 224 and/or the fill server 226. Servers 222, 224, 226 may process and communicate this data to the trading device 210. The trading device 210, for example, using a trading application, may process this data. For example, the data may be displayed to a user. In another example, the data may be utilized in a trading algorithm to determine whether a trade order should be submitted to the exchange 230. The trading device 210 may prepare and send an order message to the exchange 230.

In certain embodiments, the gateway 220 is part of the trading device 210. For example, the components of the gateway 220 may be part of the same computing platform as the trading device 210. As another example, the functionality of the gateway 220 may be performed by components of the trading device 210. In certain embodiments, the gateway 220 is not present. Such an arrangement may occur when the trading device 210 does not need to utilize the gateway 220 to communicate with the exchange 230, such as if the trading device 210 has been adapted to communicate directly with the exchange 230.

IV. Expanded Computing Device

Figure 3:
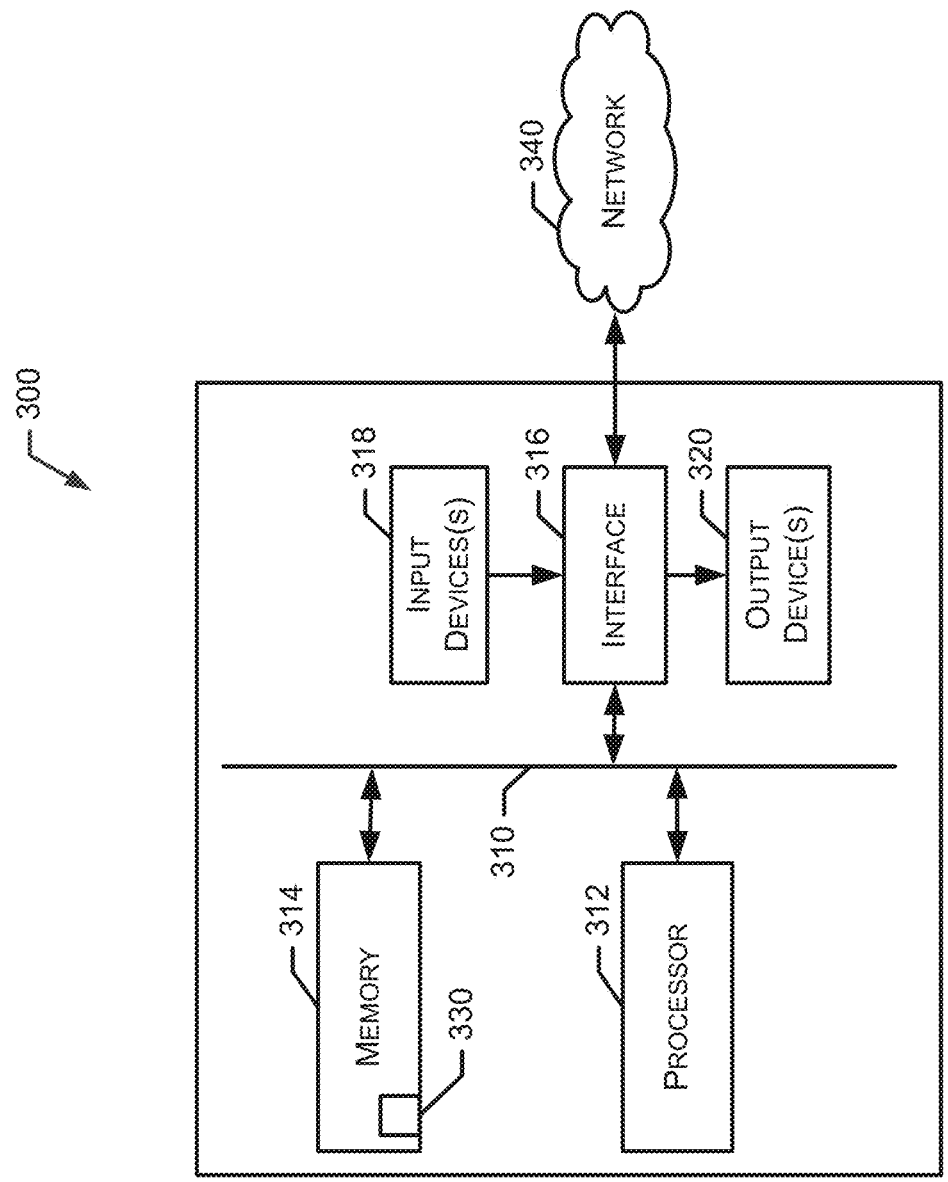
FIG. 3 illustrates a block diagram of an example computing device that may be used to implement the disclosed embodiments.

FIG. 3 illustrates a block diagram of an example computing device 300 which may be used to implement the disclosed embodiments. The trading device 110 of FIG. 1 may include one or more computing devices 300, for example. The gateway 120 of FIG. 1 may include one or more computing devices 300, for example. The exchange 130 of FIG. 1 may include one or more computing devices 300, for example.

The computing device 300 includes a communication network 310, a processor 312, a memory 314, an interface 316, an input device 318, and an output device 320. The computing device 300 may include additional, different, or fewer components. For example, multiple communication networks, multiple processors, multiple memory, multiple interfaces, multiple input devices, multiple output devices, or any combination thereof, may be provided. As another example, the computing device 300 may not include an input device 318 or output device 320.

As shown in FIG. 3, the computing device 300 may include a processor 312 coupled to a communication network 310. The communication network 310 may include a communication bus, channel, electrical or optical network, circuit, switch, fabric, or other mechanism for communicating data between components in the computing device 300. The communication network 310 may be communicatively coupled with and transfer data between any of the components of the computing device 300.

The processor 312 may be any suitable processor, processing unit, or microprocessor. The processor 312 may include one or more general processors, digital signal processors, application specific integrated circuits, field programmable gate arrays, analog circuits, digital circuits, programmed processors, and/or combinations thereof, for example. The processor 312 may be a single device or a combination of devices, such as one or more devices associated with a network or distributed processing. Any processing strategy may be used, such as multi-processing, multi-tasking, parallel processing, and/or remote processing. Processing may be local or remote and may be moved from one processor to another processor. In certain embodiments, the computing device 300 is a multi-processor system and, thus, may include one or more additional processors which are communicatively coupled to the communication network 310.

The processor 312 may be operable to execute logic and other computer readable instructions encoded in one or more tangible media, such as the memory 314. As used herein, logic encoded in one or more tangible media includes instructions which may be executable by the processor 312 or a different processor. The logic may be stored as part of software, hardware, integrated circuits, firmware, and/or micro-code, for example. The logic may be received from an external communication device via a communication network such as the network 340. The processor 312 may execute the logic to perform the functions, acts, or tasks illustrated in the figures or described herein.

The memory 314 may be one or more tangible media, such as computer readable storage media, for example. Computer readable storage media may include various types of volatile and non-volatile storage media, including, for example, random access memory, read-only memory, programmable read-only memory, electrically programmable read-only memory, electrically erasable read-only memory, flash memory, any combination thereof, or any other tangible data storage device. As used herein, the term non-transitory or tangible computer readable medium is expressly defined to include any type of computer readable medium and to exclude propagating signals. The memory 314 may include any desired type of mass storage device including hard disk drives, optical media, magnetic tape or disk, etc.

The memory 314 may include one or more memory devices. For example, the memory 314 may include local memory, a mass storage device, volatile memory, non-volatile memory, or a combination thereof. The memory 314 may be adjacent to, part of, programmed with, networked with, and/or remote from processor 312, so the data stored in the memory 314 may be retrieved and processed by the processor 312, for example. The memory 314 may store instructions which are executable by the processor 312. The instructions may be executed to perform one or more of the acts or functions described herein or shown in the figures.

The memory 314 may store a trading application 330. In certain embodiments, the trading application 330 may be accessed from or stored in different locations. The processor 312 may access the trading application 330 stored in the memory 314 and execute computer-readable instructions included in the trading application 330.

In certain embodiments, during an installation process, the trading application may be transferred from the input device 318 and/or the network 340 to the memory 314. When the computing device 300 is running or preparing to run the trading application 330, the processor 312 may retrieve the instructions from the memory 314 via the communication network 310.

V. Strategy Trading

In addition to buying and/or selling a single tradeable object, a user may trade more than one tradeable object according to a trading strategy. One common trading strategy is a spread and trading according to a trading strategy may also be referred to as spread trading. Spread trading may attempt to capitalize on changes or movements in the relationships between the tradeable object in the trading strategy, for example.

An automated trading tool may be utilized to trade according to a trading strategy, for example. For example, the automated trading tool may include AUTOSPREADER®, provided by Trading Technologies.

A trading strategy defines a relationship between two or more tradeable objects to be traded. Each tradeable object being traded as part of a trading strategy may be referred to as a leg or outright market of the trading strategy.

When the trading strategy is to be bought, the definition for the trading strategy specifies which tradeable object corresponding to each leg should be bought or sold. Similarly, when the trading strategy is to be sold, the definition specifies which tradeable objects corresponding to each leg should be bought or sold. For example, a trading strategy may be defined such that buying the trading strategy involves buying one unit of a first tradeable object for leg A and selling one unit of a second tradeable object for leg B. Selling the trading strategy typically involves performing the opposite actions for each leg.

In addition, the definition for the trading strategy may specify a spread ratio associated with each leg of the trading strategy. The spread ratio may also be referred to as an order size for the leg. The spread ratio indicates the quantity of each leg in relation to the other legs. For example, a trading strategy may be defined such that buying the trading strategy involves buying 2 units of a first tradeable object for leg A and selling 3 units of a second tradeable object for leg B. The sign of the spread ratio may be used to indicate whether the leg is to be bought (the spread ratio is positive) or sold (the spread ratio is negative) when buying the trading strategy. In the example above, the spread ratio associated with leg A would be "2" and the spread ratio associated with leg B would be "−3."

In some instances, the spread ratio may be implied or implicit. For example, the spread ratio for a leg of a trading strategy may not be explicitly specified, but rather implied or defaulted to be "1" or "−1."

In addition, the spread ratio for each leg may be collectively referred to as the spread ratio or strategy ratio for the trading strategy. For example, if leg A has a spread ratio of "2" and leg B has a spread ratio of "−3", the spread ratio (or strategy ratio) for the trading strategy may be expressed as "2:−3" or as "2:3" if the sign for leg B is implicit or specified elsewhere in a trading strategy definition.

Additionally, the definition for the trading strategy may specify a multiplier associated with each leg of the trading strategy. The multiplier is used to adjust the price of the particular leg for determining the price of the spread. The multiplier for each leg may be the same as the spread ratio. For example, in the example above, the multiplier associated with leg A may be "2" and the multiplier associated with leg B may be "−3," both of which match the corresponding spread ratio for each leg. Alternatively, the multiplier associated with one or more legs may be different than the corresponding spread ratios for those legs. For example, the values for the multipliers may be selected to convert the prices for the legs into a common currency.

The following discussion assumes that the spread ratio and multipliers for each leg are the same, unless otherwise indicated. In addition, the following discussion assumes that the signs for the spread ratio and the multipliers for a particular leg are the same and, if not, the sign for the multiplier is used to determine which side of the trading strategy a particular leg is on.

Figure 4:
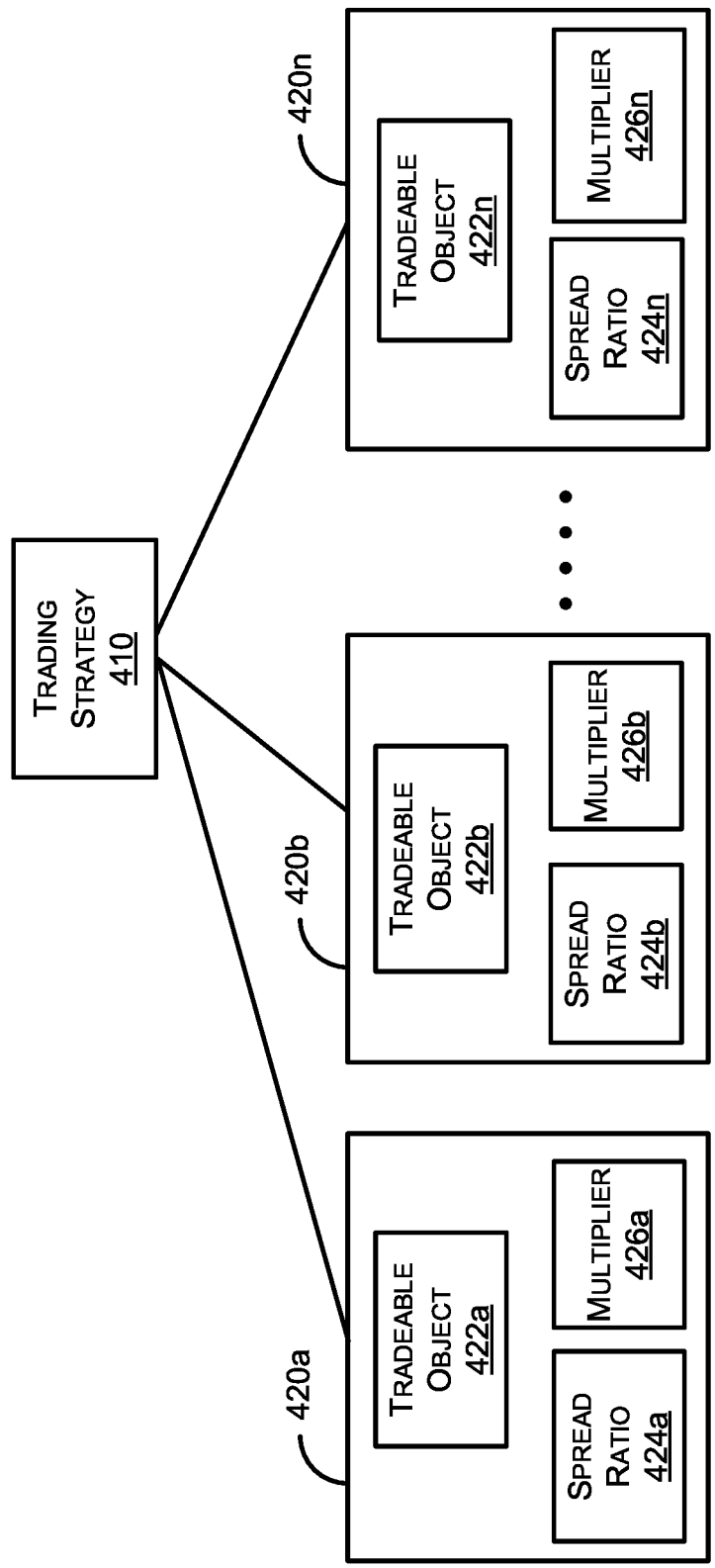
FIG. 4 illustrates a block diagram of a trading strategy, which may be employed with certain disclosed embodiments.

FIG. 4 illustrates a block diagram of a trading strategy 410 which may be employed with certain disclosed embodiments. The trading strategy 410 includes "n" legs 420 (individually identified as leg 420a to leg 420n). The trading strategy 410 defines the relationship between tradeable objects 422 (individually identified as tradeable object 422a to tradeable object 422n) of each of the legs 420a to 420n using the corresponding spread ratios 424a to 424n and multipliers 426a to 426n.

Once defined, the tradeable objects 422 in the trading strategy 410 may then be traded together according to the defined relationship. For example, assume that the trading strategy 410 is a spread with two legs, leg 420a and leg 420b. Leg 420a is for tradeable object 422a and leg 420b is for tradeable object 422b. In addition, assume that the spread ratio 424a and multiplier 426a associated with leg 420a are "1" and that the spread ratio 424b and multiplier 426b associated with leg 420b are "−1". That is, the spread is defined such that when the spread is bought, 1 unit of tradeable object 422a is bought (positive spread ratio, same direction as the spread) and 1 unit of tradeable object 422b is sold (negative spread ratio, opposite direction of the spread). As mentioned above, typically in spread trading the opposite of the definition applies. That is, when the definition for the spread is such that when the spread is sold, 1 unit of tradeable object 422a is sold (positive spread ratio, same direction as the spread) and 1 unit of tradeable object 422b is bought (negative spread ratio, opposite direction of the spread).

The price for the trading strategy 410 is determined based on the definition. In particular, the price for the trading strategy 410 is typically the sum of price the legs 420a-420n comprising the tradeable objects 422a-422n multiplied by corresponding multipliers 426a-426n. The price for a trading strategy may be affected by price tick rounding and/or pay-up ticks. However, both of these implementation details are beyond the scope of this discussion and are well-known in the art.

Recall that, as discussed above, a real spread may be listed at an exchange, such as exchange 130 and/or 230, as a tradeable product. In contrast, a synthetic spread may not be listed as a product at an exchange, but rather the various legs of the spread are tradeable at one or more exchanges. For the purposes of the following example, the trading strategy 410 described is a synthetic trading strategy. However, similar techniques to those described below may also be applied by an exchange when a real trading strategy is traded.

Continuing the example from above, if it is expected or believed that tradeable object 422a typically has a price 10 greater than tradeable object 422b, then it may be advantageous to buy the spread whenever the difference in price between tradeable objects 422a and 422b is less than 10 and sell the spread whenever the difference is greater than 10. As an example, assume that tradeable object 422a is at a price of 45 and tradeable object 422b is at a price of 40. The current spread price may then be determined to be (1)(45)+ (−1)(40)=5, which is less than the typical spread of 10. Thus, a user may buy 1 unit of the spread, which results in buying 1 unit of tradeable object 422a at a price of 45 and selling 1 unit of tradeable object 422b at 40. At some later time, the typical price difference may be restored and the price of tradeable object 422a is 42 and the price of tradeable object 422b is 32. At this point, the price of the spread is now 10. If the user sells 1 unit of the spread to close out the user's position (that is, sells 1 unit of tradeable object 422a and buys 1 unit of tradeable object 422b), the user has made a profit on the total transaction. In particular, while the user bought tradeable object 422a at a price of 45 and sold at 42, losing 3, the user sold tradeable object 422b at a price of 40 and bought at 32, for a profit of 8. Thus, the user made 5 on the buying and selling of the spread.

The above example assumes that there is sufficient liquidity and stability that the tradeable objects can be bought and sold at the market price at approximately the desired times. This allows the desired price for the spread to be achieved. However, more generally, a desired price at which to buy or sell a particular trading strategy is determined. Then, an automated trading tool, for example, attempts to achieve that desired price by buying and selling the legs at appropriate prices. For example, when a user instructs the trading tool to buy or sell the trading strategy 410 at a desired price, the automated trading tool may automatically place an order (also referred to as quoting an order) for one of the tradeable objects 422 of the trading strategy 410 to achieve the desired price for the trading strategy (also referred to as a desired strategy price, desired spread price, and/or a target price). The leg for which the order is placed is referred to as the quoting leg. The other leg is referred to as a lean leg and/or a hedge leg. The price that the quoting leg is quoted at is based on a target price that an order could be filled at in the lean leg. The target price in the hedge leg is also known as the leaned on price, lean price, and/or lean level. Typically, if there is sufficient quantity available, the target price may be the best bid price when selling and the best ask price when buying. The target price may be different than the best price available if there is not enough quantity available at that price or because it is an implied price, for example. As the leaned on price changes, the price for the order in the quoting leg may also change to maintain the desired strategy price.

The leaned on price may also be determined based on a lean multiplier and/or a lean base. A lean multiplier may specify a multiple of the order quantity for the hedge leg that should be available to lean on that price level. For example, if a quantity of 10 is needed in the hedge leg and the lean multiplier is 2, then the lean level may be determined to be the best price that has at least a quantity of 20 available. A lean base may specify an additional quantity above the needed quantity for the hedge leg that should be available to lean on that price level. For example, if a quantity of 10 is needed in the hedge leg and the lean base is 5, then the lean level may be determined to be the best price that has at least a quantity of 15 available. The lean multiplier and lean base may also be used in combination. For example, the lean base and lean multiplier may be utilized such that larger of the two is used or they may be used additively to determine the amount of quantity to be available.

When the quoting leg is filled, the automated trading tool may then submit an order in the hedge leg to complete the strategy. This order may be referred to as an offsetting or hedging order. The offsetting order may be placed at the leaned on price or based on the fill price for the quoting order, for example. If the offsetting order is not filled (or filled sufficiently to achieve the desired strategy price), then the strategy order is said to be "legged up" or "legged" because the desired strategy relationship has not been achieved according to the trading strategy definition.

In addition to having a single quoting leg, as discussed above, a trading strategy may be quoted in multiple (or even all) legs. In such situations, each quoted leg still leans on the other legs. When one of the quoted legs is filled, typically the orders in the other quoted legs are cancelled and then appropriate hedge orders are placed based on the lean prices that the now-filled quoting leg utilized.

V. Strategy Trading

When numerous trading strategies (e.g., spreads and/or algorithmic trading strategies, etc.) are configured, it can be difficult to know at a glance which of those trading strategies is using which contracts. Additionally, when numerous trading strategies (e.g., spreads and/or other tradeable objects) share a contract, identification of shared contracts is a manual process to reconfigure those trading strategies (e.g., spreads) when the shared contract is to "roll" or shift to a next month (e.g., a new expiration) and/or other contract. It is noted that the various examples are described herein with respect to a spread; however, it should be understood that the various examples may be used with other kinds of trading strategies.

Certain examples provide graphical representation and manipulation of trading strategies. Through interaction with one or more graphical representations (e.g., nodes, connectors, etc., in a strategy graph interface), tradeable objects forming a trading strategy can be configured and reconfigured such that a configuration for the trading strategy includes tradeable object(s) having a different expiration date or duration, tradeable object(s) of a different type, tradeable object(s) at a different exchange, etc. Interaction can include selecting (e.g., clicking, double clicking, etc.) a graphical representation, dragging and dropping a graphical representation, etc., to rearrange the graphical representation on a spread graph graphical user interface. Interaction with graphical representation(s) via the user interface triggers a corresponding change to a configuration and/or definition of a trading strategy corresponding to the graphical representation(s).

In certain examples, interaction with different graphical representations triggers different actions with respect to the graphical user interface and associated trading strategy configuration. For example, selecting a node displayed in a graph on the interface may trigger an automatic movement of a connector end point from the selected node to a next node according to a preset configuration or relationship of contract nodes (e.g., a list of contracts with chronological expirations, a set of related contract types at a plurality of exchanges, etc.). Alternatively or in addition, selecting an end point of a line connector and moving (e.g., drag and drop) that end point from a first node to a second node triggers reconfiguration of an associated trading strategy through the visual movement from the first contract to the second contract.

More particularly, certain examples address identification and rolling of contracts, such as shared contracts, to reconfigure a trading strategy definition. In certain examples, providing improved, automated systems and methods to roll or otherwise reconfigure and/or redefine the formula for a trading strategy, such as a spread, etc., is at least two a two-step process. The first step in the process involves generation of a visualization of trading strategies (e.g., spreads and/or other tradeable objects) and associated products/contracts for which those trading strategies are configured via a graphical user interface (e.g. a trading interface). A visual "canvas" is provided that allows a layout of trading strategies and associated products/contracts to be re-arranged. For example, a trader can drag and drop graphical representations of contract and/or other products via the interface to adjust relationships and/or visualize relationships between contracts/products included in pending trading strategies (e.g., spreads for the particular trader, trading group, etc.). The visualization via the interface provides an at-a-glance view of those contracts that are shared among multiple trading strategies (e.g., spreads), for example.

In certain examples, the visualization is provided via a graphical representation (e.g., a spread graph) of a trading strategy such as a spread. The spread graph depicts different elements of the trading strategy as graphical elements linked via flexible connectors. For example, a trading strategy may be depicted as a strategy node that identifies the specific spread in operation at a trading device. Another element may be a tradeable object cooperating with one or more contract nodes. Each contract node, in turn, identifies a contract expiration date. Flexible connectors can be defined between the strategy node and each contract node corresponding to the contract expiration date specified by the trading strategy. Multiple connectors from multiple trading strategies may be directed to the same contract node and contract expiration date.

The next step in the example process utilizes the above described visualization to provide a mechanism that enables and simplifies a contract roll and/or other re-configuration. For example, end points of each of the multiple connectors can be selected and reposition from a first contract node to a second contract node. Movement between first and second contract nodes represents a contract roll such that each end point (e.g., representing a duration or expiration date, another ending event, etc.) associated with the first contract node is reassigned to the second contract node. In response to the realignment of end points, the trading strategy configuration and definition is updated, and updated parameters are communicated to the trading device for execution.

For example, a contract may be associated with an expiration date and can be configured to roll or extend from a current month to a next expiration month, effectively extending the contract for a month. As described above, by "rolling" or reconfiguring a contract for a tradeable object to shift or extend from one contract to another, the contract for the tradeable object can be extended by closing the initial contract having an upcoming expiration date and opening a new contract having a more distant expiration date for the same underlying tradeable object. The roll of a trading strategy from a soon-to-expire contract to a contract having a more distant expiration date (e.g., next month) maintains the tradeable object beyond the expiration of the initial contract and is typically executed before the expiration of the initial soon-to-expire contract, for example.

Alternatively or in addition to a roll from a soon-to-expire contract to a contract having a more distant expiration date, a trading strategy can be reconfigured by rolling from a first type of contract to a second type of contract. For example, a contract can be rolled from a first contract at a first exchange to a second contract at a second exchange.

In certain examples, a trading strategy definition and/or an individual contract definition includes a listing or other description of one or more related contracts associated with a given contract displayed via the graphical user interface. Using this information, a progression, sequence, and/or other relationship between contract nodes can be evaluated and determined such that selection of a given contract node and/or its flexible connector automatically triggers a movement of the connector from the given contract node to a next contract node according to the progression, sequence, and/or other relationship defined with respect to that contract. For example, the system determines a progression of contract months for a given contract type so that selection and/or activation of a contract node, connector, and/or other associated graphical representation provided via the graphical user interface triggers a movement to a next contract node in the defined sequence (e.g., from a contract expiring in May 2013 to a contract expiring in June 2013 and so on).

In another example, suppose a user is trading both a TUB spread and a NOB spread, and these spreads share a ZB contract. When the user has decided that, for example, he or she is ready for (or otherwise needs) the ZB contract that is used in both of these spreads to roll from a DEC13 contract to a MAR14 contract, he or she can trigger that roll via a spread graph graphical user interface. For example, using the displayed contract nodes and associated strategy connectors, a shared end-point from the DEC13 contract can be dragged and dropped to the MAR14 contract's endpoint.

Alternatively or in addition, chronological details of the contracts involved in the trading strategy can be identified by the spread graph system and associated method, which then allows automatic roll-to-the-next of a contract based on a selection (e.g., a double click or other graphical user interface action, etc.) of a graphical representation of the contract endpoint, etc. Activation of the graphical representation of a contract, end point, connector, etc., allows, in one operation, a roll-to-the-next month for all spreads that share a leg. In certain examples, the graphical spread graph interface allows one spread's leg to be dragged and dropped from one month to a different month via the interface. Thus, a contract roll may be further achieved selecting the element representing the tradeable object, which causes all of the trading strategies connected to the element via the flexible connector to shift or roll to the next contract node and contract expiration date.

Certain examples facilitate rolling and/or other modification of a trading strategy via a graph-based strategy trading tool. The graph-based strategy trading tool represents a configuration of one or more trading strategies and one or more tradeable objects used in the trading strategy(-ies) represented as nodes of a directed graph. A node may represent a contract and/or other tradeable object. Subsets of the tradeable objects may be part of one or more trading strategies.

FIGS. 5A-5D illustrate an example graph-based strategy trading configuration tool showing a strategy graph representing tradeable objects as available nodes of a trading strategy for manipulation to reconfigure that trading strategy.

Figure 5A:
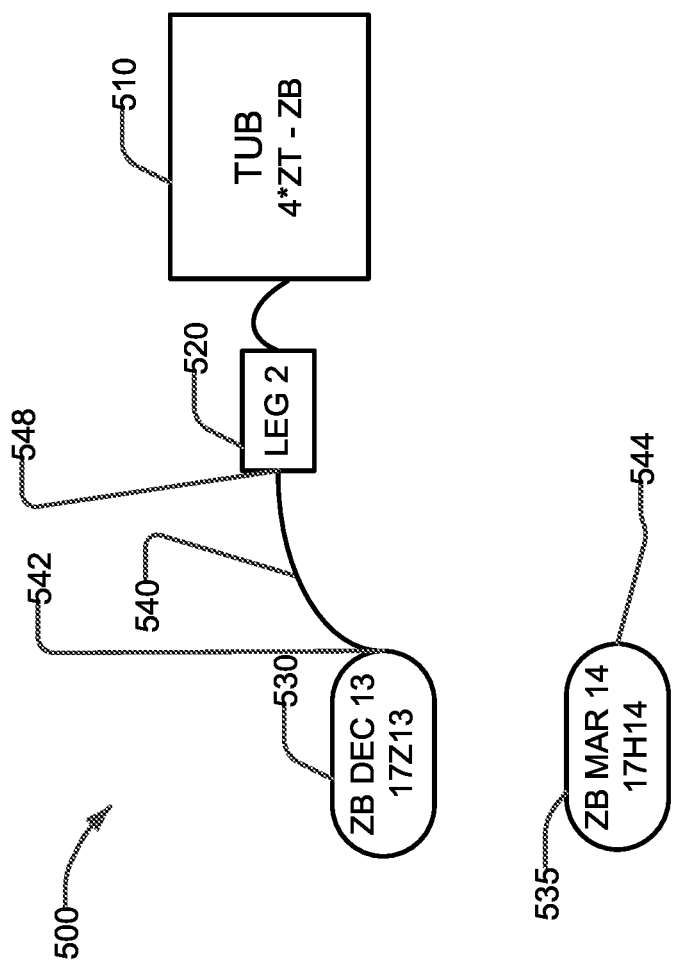
FIGS. 5A-5D illustrate an example graph-based strategy trading configuration tool displaying a strategy graph showing tradeable objects as available nodes of a trading strategy in accordance with certain disclosed embodiments.

FIG. 5A illustrates an example graph-based strategy trading tool which displays a strategy graph 500 showing contract nodes 530, 535 as representing tradeable objects having different expiration dates as nodes (e.g., contract nodes) available to a trading strategy 510 (e.g., a leg 520 of a strategy node 510). The contract node 535 as depicted in FIG. 5A represents an available but unused contract node. The contract node 530 represents an available and active (e.g., used to define the trading strategy 510) contract node. As illustrated in the example of FIG. 5A, a graphical connector 540 (e.g., a strategy leg connector) extends between the leg 520 and the first contract node 530. The graphical connector 540 connects to the first contract node 530 at a connection point 542 and connects to the leg 520 at a connection point 548.

Figure 5B:
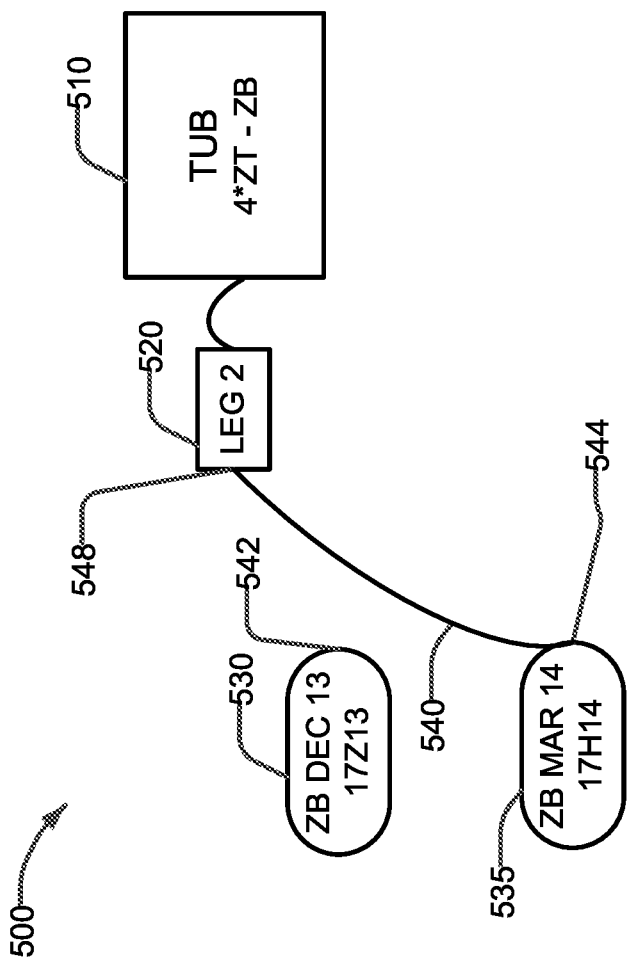
Figure 5C:
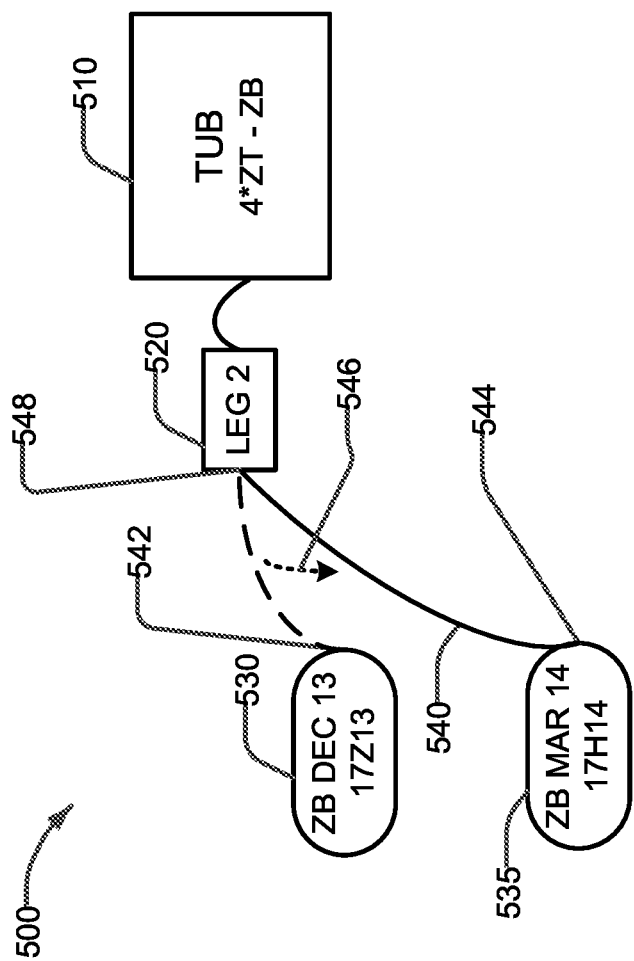

As illustrated in the example of FIG. 5B, the graphical connector 540 can be moved (e.g., rolled) to instead connect to the second contract node 535. For example, a user can select and reposition the graphical connector 540 by moving the graphical connector 540 from connection point 542 on the first contract node 530 to a connection point 544 on the second contract node 535 via the strategy graph 500 to adjust an underlying definition/configuration of the associated trading strategy. Alternatively or in addition, clicking on or otherwise selecting the contract node 535 repositions the graphical connector to the connection point 544 to connect the contract node 535 and the leg 520 of the strategy node 510. Similarly, clicking on or otherwise selecting the contract node 530 can trigger an automatic movement of the graphical connector 540 to a next contract node in sequence—contract node 535. In some examples, realignment from the graphical connector's first position 542 at contract node 530 to the graphical connector's second position 544 at contract node 535 occurs automatically. Realignment of the graphical connector from the first contract node 530 to the second contract node 535 automatically triggers a change in the definition of the underlying trading strategy associated with the strategy graph 500. FIG. 5C illustrates a movement 546 of the graphical connector 540 from its first connection at connection point 542 on the first contract node 530 (shown in dashed form at time t=0) to its second connection at connection point 544 on the second contract node 535 (shown in solid line form at time t=1).

Figure 5D:
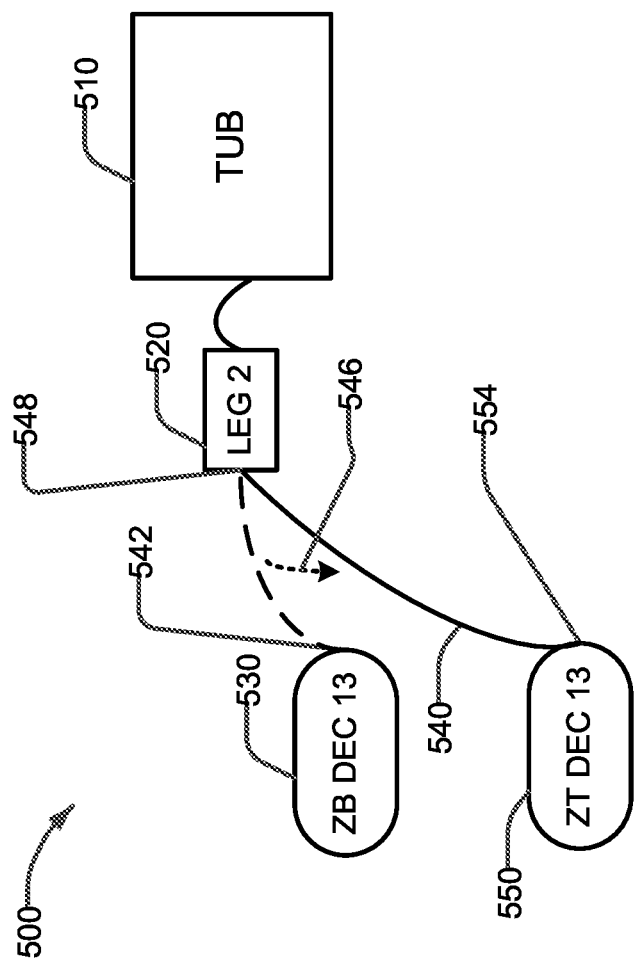

FIG. 5D shows an alternative example in which movement 546 occurs between the first contract node 530 and a third contract node 550, which is a different type of contract, rather than a same type of contract having a different expiration date. As with the example of FIGS. 5A-5C, the graphical connector 540 can be repositioned (e.g., selected, dragged and dropped, etc.) from the connection point 542 on the first contract node 530 to a connection point 554 on the third contract node 550. Movement (e.g., by moving the graphical connector 540, selecting the first contract node 530, selecting the second contract node 550, etc.) triggers a reconfiguration of the associated trading strategy configuration.

Thus, certain examples facilitate changes to trading strategy definition through movement among contracts with varying dates (e.g., moving from a contract for January to a same type of contract for February, etc.), different types (e.g., moving from a contract for corn to a contract for wheat, moving from a contract for wheat to a contract for oil, etc.), equivalent contracts on different exchanges (e.g., moving from a contract for soybeans on a first exchange to a contract for soybeans on a second exchange, etc.). Movement can be achieved though dragging and dropping an end point of a connecting line from one contract node to another contract node, selecting the current contract node, selecting the new desired contract node, etc.

Figure 6A:
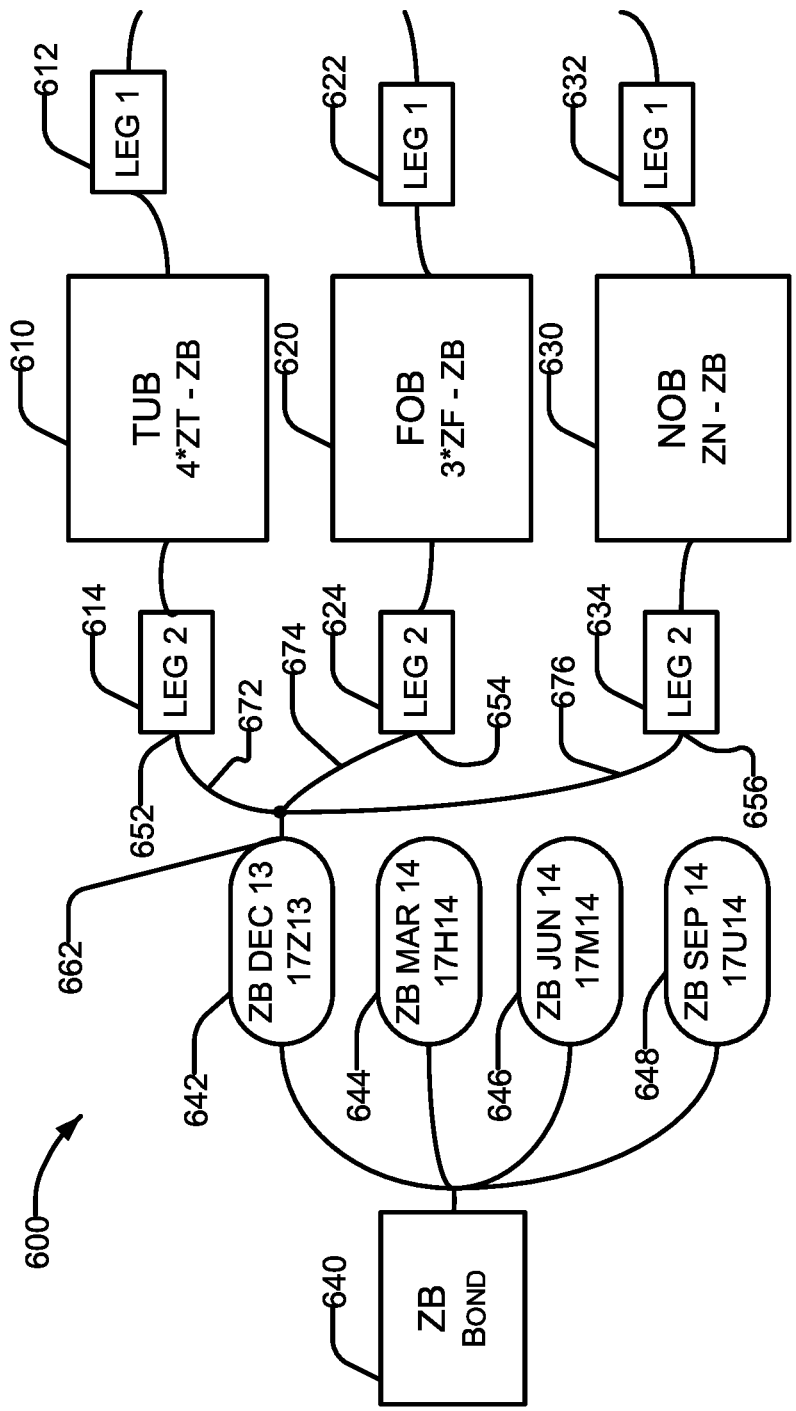
FIGS. 6A and 6B illustrate an example adjustment, via a graphical interface, of a trading strategy based on movement of a graphical connector connected to a strategy node and movable between contract nodes.
Figure 6B:
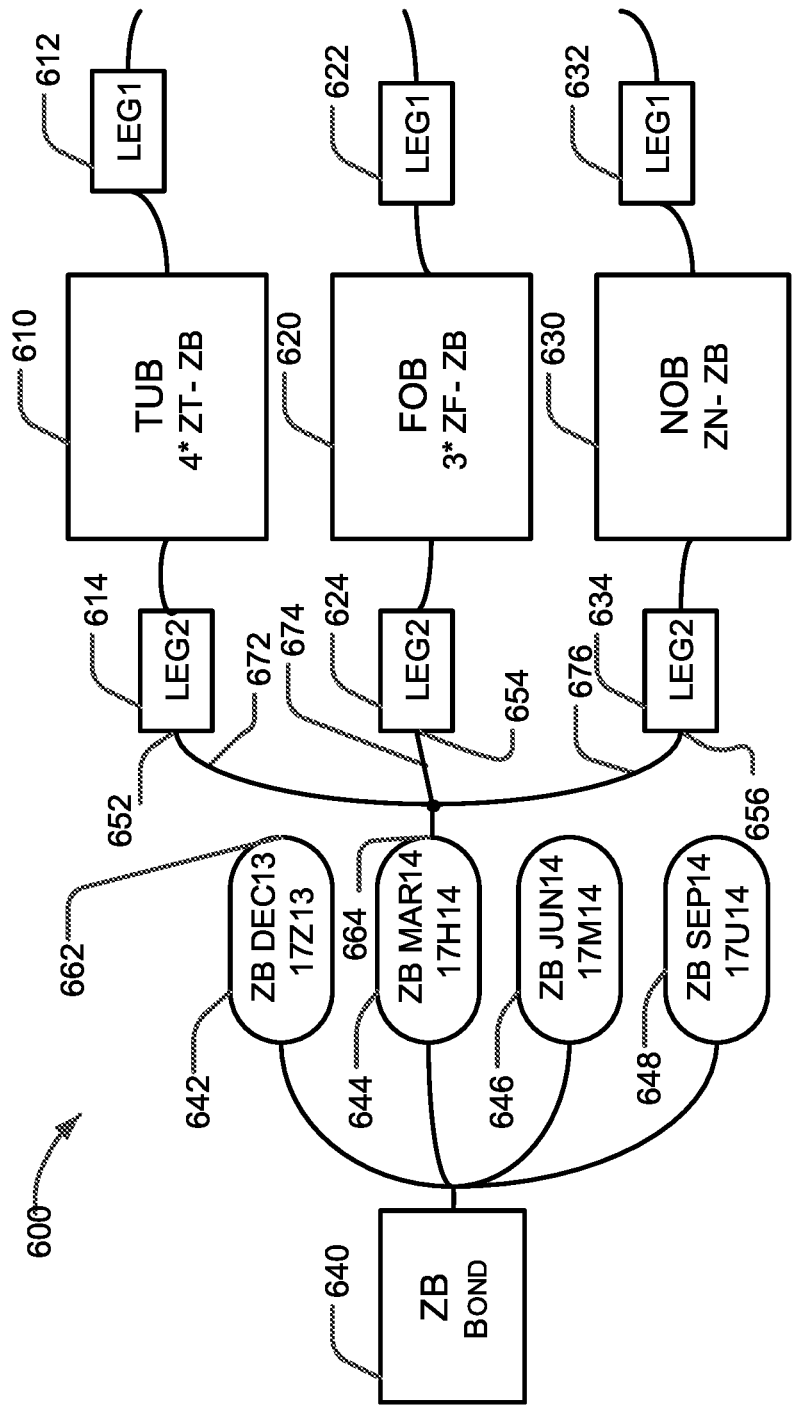

FIGS. 6A and 6B provide additional illustrations of an example adjustment, via a graphical interface 600, of a trading strategy based on movement of a graphical connector (e.g., a strategy leg connector) connected to a strategy node and movable between contract nodes. For example, a common or shared contract from one month can be rolled to another month for a same (or different) type of contract via movement of the graphical connector from one month's contract node to another month's contract node (e.g., from a ZB contract for February 2013 to a ZB contract for March 2013, etc.).

FIG. 6A illustrates an example trading interface 600 showing a connected graph-based representation of one or more trading strategies, such as spreads, utilizing one or more component tradeable objects (e.g., contracts) to form each trading strategy. The example 600 of FIG. 6A is shown with three spreads: a TUB spread 610, a FOB spread 620, and a NOB spread 630. Each spread 610, 620, 630 has a first leg and a second leg. The TUB spread 610 includes a first leg 612 (e.g., 4*ZT) and a second leg 614 (ZB). The FOB spread 620 includes a first leg 632 (e.g., 3*ZF) and a second leg 624 (ZB). The NOB spread 630 includes a first leg 632 (e.g., ZN) and a second leg 634 (ZB).

Each of the second legs 614, 624, 634 shares a contract ZB 640. As shown in the example of FIG. 6A, the second legs 614, 624, 634 are initially connected via graphical connectors (e.g., strategy leg connectors) to a December 2013 ZB contract node 642. However, other ZB contracts also exist: ZB March 2014 (labeled 17Z13) 644, ZB June 2014 (labeled 17M14) 646, and ZB September 2014 (labeled 17U14) 648.

More particularly, leg 614 has a graphical connector 672 connecting the leg 614 to contract node 642. The graphical connector 672 extends from a connection point 652 on the leg node 614 to a connection point 662 on the contract node 642. Similarly, a graphical connector 674 connects leg 624 to the contract node 642. The graphical connector 674 extends from a connection point 654 on the leg 624 and connects to the contract node 642 at the connection point 662. A graphical connector 676 extends from a connection point 656 on the leg 634 to connect the leg 634 to the contract node 642 at the connection point 662.

As shown in the example of FIG. 6B, by interacting with a graphical representation 600, contract relationship to the plurality of trading strategy nodes 610, 620, 630 can be adjusted. For example, by selecting (e.g., single clicking, double clicking, mousing over, etc.) the 17Z13 label for the ZB DEC 13 contract node 642, the spread configurations 610, 620, 630 are all rolled over to the next configured contract labeled 17H14 for ZB MAR 14 contract 644. Alternatively or in addition, selected the desired contract node (e.g., the ZB MAR 14 contract representation 644) triggers the roll over for second legs 614, 624, 634 of spreads 610, 620, 630, respectively. Additionally or alternatively, selection of the graphical connector (e.g., by clicking on it, by dragging and dropping an end of the connector, etc.) can reposition the graphical connector from a first node to a second node. Adjustment of the nodes and connectors via the graphical representation 600 automatically triggers a corresponding adjustment in the underlying trading strategies being traded on an exchange.

Figure 7:
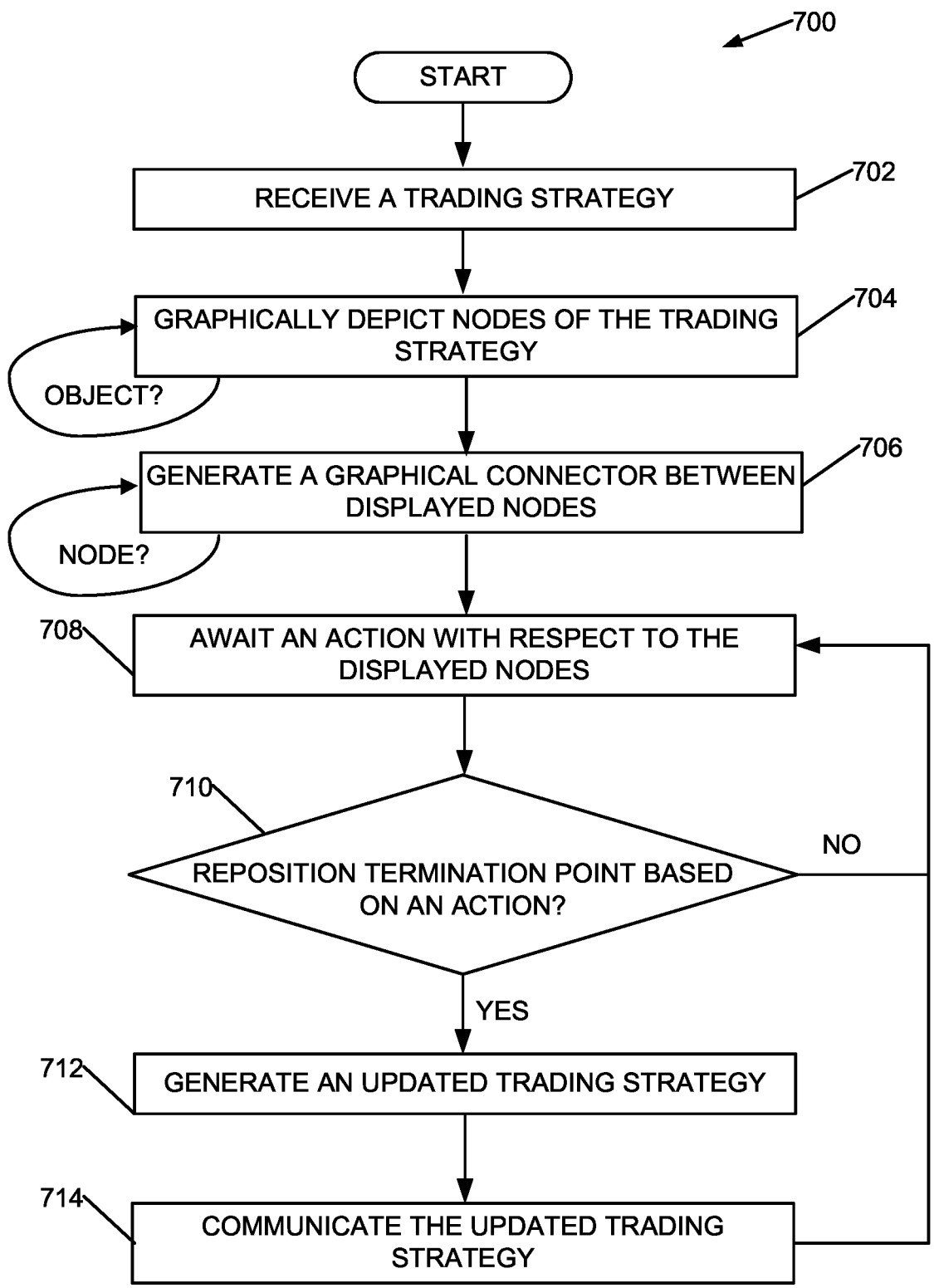
FIG. 7 is a flow diagram representative of an example method to graphically visualize and reconfigure a trading strategy in accordance with certain disclosed embodiments.

Thus, in the example of FIG. 6B, the graphical connectors 672, 674, 676 associated with legs 614, 624, 634, respectively, are moved from a connection point 662 associated with the contract 642 to a connection point 664 associated with the contract node 644. By clicking on or otherwise selecting the contract node 642 and/or the contract node 644, the legs 614, 624, 634 sharing the contract node 642 all have their graphical connectors 672, 674, 676 moved to the updated connection point 664 corresponding to the contract node 644. Predefined information stored in associated with the trading strategy configuration information indicates that the contract 644 is next in sequence following the contract 642, for example. Alternatively or in addition, moving one or more of the graphical connectors 672, 674, 676 from the connection point 662 to the connection point 664 can result in the configuration of some or all of the legs 614, 624, 634 based on the new contract 644. Trading strategy configuration is automatically triggered, updated, and stored based on the movement of the trading strategy graph 600. The trading strategy configuration/definition can be executed and/or sent for execution at an exchange, for example. FIG. 7 is a flow diagram representative of an example method 700 to graphically visualize and reconfigure a trading strategy. At block 702, a trading strategy is received. For example, a definition of a trading strategy including one or more strategy nodes and one or more associated contract nodes connected to the strategy node(s) via graphical connectors (e.g., strategy leg connectors) is received at a computing device, such as a trading device, executing a graphical user interface, such as a trading interface, showing an interactive trading strategy graph (e.g., graph 500, 600). The computing device identifies the nodes (e.g., the strategy node and one or more associated contract nodes) forming the trading strategy.

At block 704, nodes of the trading strategy are depicted via the graphical user interface. For example, a strategy node and contract nodes of the trading strategy are depicted via the graphical user interface. The strategy node represents a trading strategy associated with two or more tradeable objects associated with the contract nodes. Each contract node represents a contract expiration date associated with one of the tradeable objects specified by the trading strategy, for example. The underlying element or object of the trading strategy is operating at the trading device running the graphical user interface, for example. Block 704 can be repeated until all nodes of the trading strategy are displayed.

At block 706, a graphical connector is generated between the strategy node and a contract node. The graphical connector (e.g., a strategy leg connector connecting legs of a spread trading strategy) connects the strategy node and the contract node according to the definition of the associated trading strategy. The graphical connection at block 706 is repeated based on a number of contract nodes associated with the strategy node. Block 706 can be repeated for additional strategy nodes as well.

At block 708, an action with respect to the displayed nodes is awaited. For example, user input with respect to a node and/or graphical connector via the graphical user interface is awaited.

At block 710, an endpoint of a graphical connector displayed via the graphical user interface is repositioned based on an identified action. For example, an end point of a graphical connector is repositioned, in response to an input, from a connection point on a first contract node that is specified by the trading strategy to a connection point on a second contract node related to the first contract node. For example, the second contract node may be related to the first contract node in that the contracts relate to different dates of expiration for a same type of tradeable object (e.g., ZB March 2014 and ZB June 2014). For example, a user may click on and/or otherwise select the first contract node, the second contract node, and/or the graphical connector to reposition the graphical connector between the strategy node and the second contract node (e.g., by clicking, double clicking, dragging and dropping, etc.). In other examples, the second contract node may be for a completely different type of contract than the first contract node (e.g., from steel to milk, etc). In some examples, while the type of contract may be the same, the exchange at which the contract is traded may be different (e.g., switching from a contract for orange futures at a first exchange to a contract for orange futures at a second exchange).

At block 712, an updated trading strategy is generated based on the original trading strategy and the repositioned end point of the graphical connector. For example, by repositioning a leg of a spread from connecting at the first contract node (e.g., ZB March 2014) to connect at the second contract node (e.g., ZB June 2014), a new spread trading strategy definition is generated. At block 714, the updated trading strategy definition is communicated to a computing device such as a trading device. For example, the updated trading strategy definition or configuration associated with the updated spread graph is communicated to the trading device providing the graphical user interface and/or a separate trading device.

Figure 8:
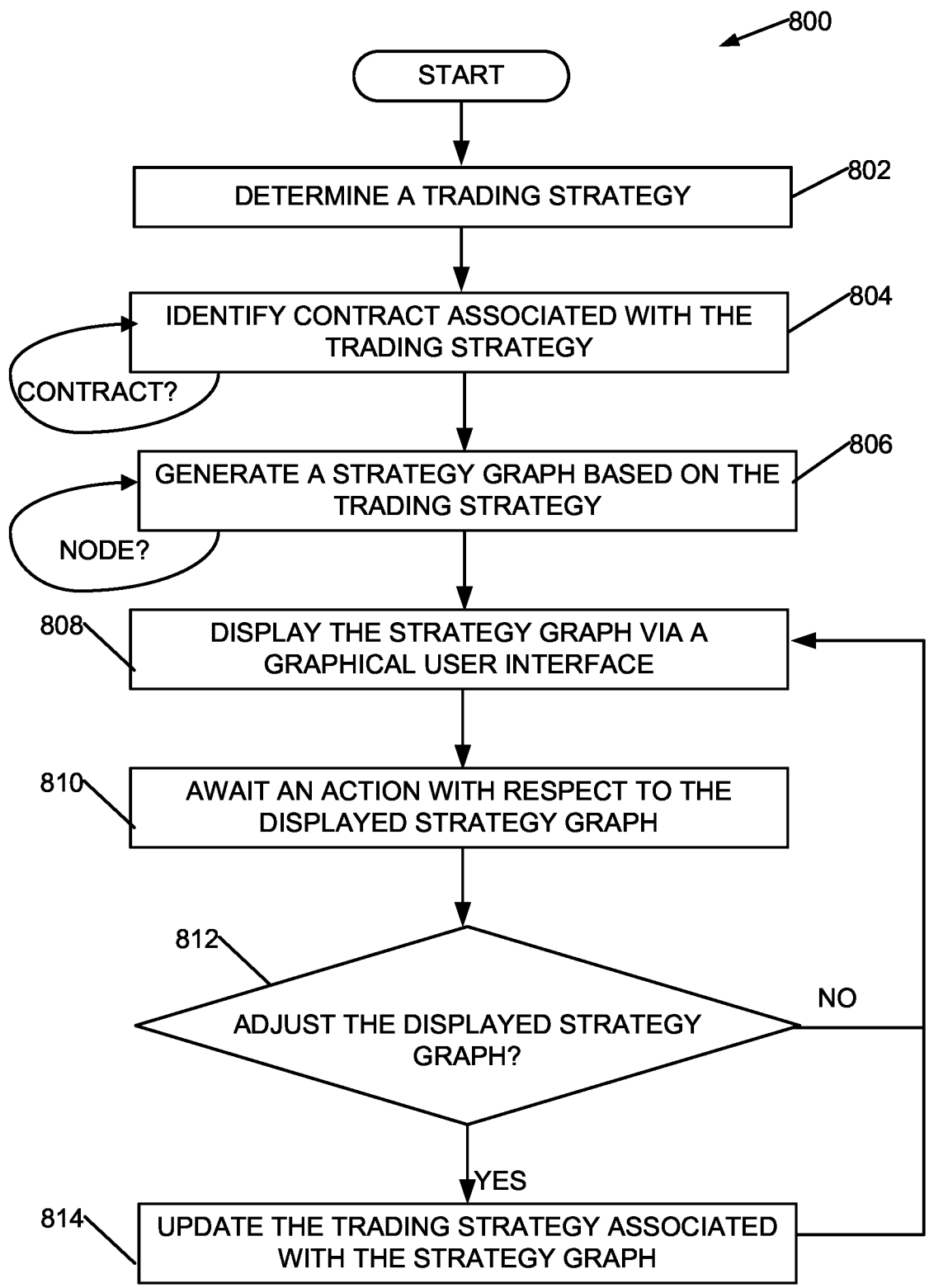
FIG. 8 is a flow diagram representative of an example method to graphically generate and update a trading strategy in accordance with certain disclosed embodiments.

Using a graphical layout tool, a trading strategy can be constructed, monitored, and updated via a graph-based representation. FIG. 8 is a flow diagram representative of an example method 800 to graphically generate and update a trading strategy. At block 802, a trading strategy relating to the purchase and sale of at least two tradeable objects is generated. For example, a computing device (e.g., the trading device 210 or other computing device 300) determines the trading strategy based on information regarding the two or more tradeable objects. In some examples, a trading strategy is graphically generated by a user using a graphical trading strategy algorithm creation tool such as ADL® provided by Trading Technologies, International.

At block 804, a first contract associated with a first of the at least two tradeable objects and a second contract associated with the first of the at least two tradeable objects are identified based on the tradeable objects in the trading strategy. For example, the first and second contracts each relate to a contract expiration date to which the tradeable object is applicable (e.g., ZB March 2014 and ZB June 2014). The first and second contracts may be specified as tradeable objects in association with a trading strategy algorithm, for example. Block 804 can be repeated for a plurality of contracts involved in the trading strategy.

At block 806, a strategy graph is generated based on the trading strategy. For example, the strategy graph includes a strategy node and a plurality of contract nodes. Each of the plurality of contract nodes is associated with and identifies a respective contract expiration date (e.g., first and second contract nodes correspond to the first and second contracts relating to first and second contract expiration dates, respectively). The strategy node identifies the trading strategy including the contract nodes. The strategy node is connected to at least one contract node using a strategy leg connector. The strategy leg connector is arranged to visually connect the strategy node to one of the plurality of contract nodes. For example, a first strategy leg connector that links the trading strategy node to the first contract, and a second strategy leg connector links the trading strategy node to the second contract. Block 806 can be repeated to generate and connect a plurality of contract nodes associated with the strategy node.

At block 808, the strategy graph is displayed via a graphical user interface. For example, graphical representations of the strategy and plurality of contract nodes are displayed via a graphical user interface, such as a trading interface running on a computing device. Strategy leg connectors forming part of the strategy graph are also displayed via the graphical user interface.

At block 810, an action with respect to the displayed strategy graph is awaited. For example, user input with respect to a node and/or strategy leg connector via the graphical user interface is awaited.

At block 812, adjustment of the displayed strategy graph is facilitated. For example, by selecting and moving a strategy leg connector (e.g., dragging and dropping) between the strategy node and a contract node in the strategy graph, clicking on or otherwise selecting the strategy leg connector, clicking on or otherwise selecting a contract node in the strategy graph, etc., the strategy graph can be adjusted.

In certain examples, selection of a contract node affects a plurality of strategies involving that contract node. For example, if strategy node A and strategy node B both include a leg connected to the first contract, adjusting from the first contract to the second contract can cause both strategy node A and strategy node B to connect to the second contract node.

In some examples, the strategy node is rolled from the first contract having a first expiration date to the second contract, which is of the same type as the first contract but has a different (later) expiration date (e.g., from a contract of type X dated August 2014 to a contract of type X dated September 2014). In some examples, if an attempt is made to move to a contract having a prior date, an alert is triggered to notify the user and/or prevent such an adjustment.

In some examples, when a contract is expiring or near expiration an alert is generated to prompt action to adjust the contract to a later expiration date. In some examples, a contract may automatically be rolled based on a parameter and/or other configuration/rule if no action is taken (e.g., in order to preserve validity of the trading strategy, which cannot include an expired contract).

At block 814, the trading strategy associated with the displayed strategy graph is updated to reflect the adjustment in the underlying contract corresponding to the arrangement of the strategy leg connector. For example, adjustment of the displayed strategy graph to reposition a strategy leg connector from the strategy node to the second contract rather than the first contract triggers an update or adjustment in the trading strategy configuration such that a leg of the trading strategy now involves the second contract rather than the first contract.

In certain examples, multiple trading strategies sharing a same contract element can be updated together. For example, as discussed above, both trading strategy A and trading strategy B can be updated together based on an adjustment from the first contract to the second contract.

Figure 9:
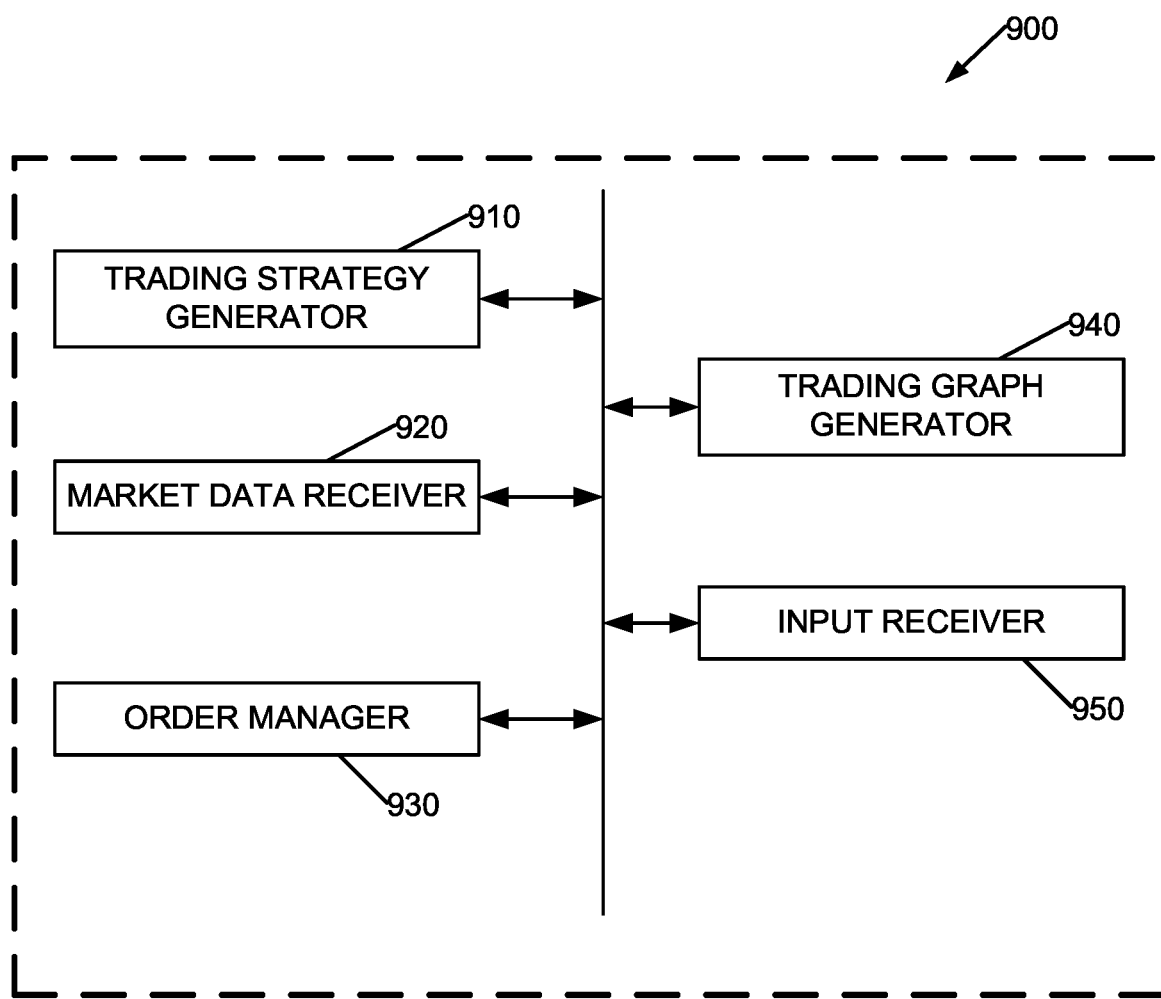
FIG. 9 illustrates a block diagram of an example trading device in accordance with certain disclosed embodiments.

FIG. 9 illustrates a block diagram of an example trading device 900 in accordance with certain embodiments. The trading device 900 may be similar to the trading device 110 discussed above, for example. The trading device 900 includes a trading strategy generator 910, a market data receiver 920, an order manager 930, a trading graph generator 940, an input receiver 950.

The trading strategy generator 910 receives, determines, and/or otherwise generates a trading strategy definition/configuration. For example, the trading strategy may include a spread trading strategy definition involving multiple legs generated from a graphical algorithmic layout tool such as ADL®. The market data receiver 920 receives market data. The market data may be received from an exchange similar to exchange 130 discussed above, for example. The market data receiver 920 works with the order manager 930 to manage one or more trading strategies provided by the trading strategy generator 910 based on market data from the market data receiver 920. The order manager 930 may communicate with an exchange and/or gateway to an exchange, for example, to facilitate trade orders on the market.

The trading graph generator 940 generates a visual graph of the trading strategy and depicts the strategy graph via a graphical user interface. Tradeable objects in the trading strategy become nodes connected by graph connectors to form a visualization of the trading strategy. The graph of the strategy is provided for user view and interaction. Based on input from the input receiver 950, one or more characteristics and/or components of the trading strategy graph and its underlying trading strategy can be adjusted. For example, a contract can be rolled from an earlier date to a later date based on user manipulation of the trading strategy graph via the user interface (for example, selection of an edge or node of a directed graph). In certain examples, the trading strategy generator 910 includes information regarding tradeable objects and relationships between tradeable objects to help facilitate generation and manipulation of the trading strategy graph (e.g., the trading strategy generator 910 stores a sequence of contracts to determine a second contract to which a first contract can be rolled with a single click and without requiring further user intervention, etc.).

The order manager 930 helps to facilitate adjustment of the underlying trading strategy based on manipulation of the displayed graph (e.g., to swap or convert a leg of a spread trading strategy as described above. Adjustment may occur in conjunction with the trading strategy generator 910, for example, to generate a new or updated trading strategy configuration/definition. The trading graph generator 940 updates the displayed graph and options included therein based on results from the order manager 930 and updated market data from the market data receiver 920, for example.

Thus, the trading graph generator 940 provides a graphical representation (e.g., a spread graph) of a trading strategy such as a spread. A spread graph depicts different elements of the trading strategy as graphical elements linked via flexible connectors. For example, a trading strategy may be depicted as a strategy node that identifies the specific spread in operation at a trading device. Another element may be a tradeable object cooperating with one or more contract nodes. Each contract node, in turn, identifies a contract expiration date. Flexible connectors can be defined between the strategy node and each contract node corresponding to the contract expiration date specified by the trading strategy. Multiple connectors from multiple trading strategies may be directed to the same contract node and contract expiration date.

The system 900 (e.g., the trading strategy generator 910) is aware of contract expiration and/or other relationship and/or sequence information such that selection of a contract node, graphical connector, connector end point, contract node end point, etc., can automatically trigger movement (and associated trading strategy reconfiguration) to a different contract node. Such information can be provided in advance (e.g., predefined) and/or can be dynamically updated based on communication with the trading device 210, gateway 220, and/or exchange 230, for example. Thus, the system 900 can be kept updated (e.g., be "aware") of contracts and parameters that are tradeable on its associated exchange(s), for example.

In operation, end point(s) from each of the multiple connectors can be selected and reposition from a first contract node to a second contract node. Movement between first and second contract nodes, detected by the input receiver 950, represents a contract roll such that each end point (e.g., associated with a termination or expiration date, another termination or ending event, etc.) associated with the first contract node is reassigned to the second contract node. In response to the reassignment of end points received by the input receiver 950, the trading strategy is updated by the trading strategy generator 910, and updated parameters are communicated for execution via the order manager 930.

For example, a contract may be associated with a termination or expiration date and can be configured to roll or extend from a current month to a next expiration month, effectively extending the contract for a month. Thus, a contract for a tradeable object can be extended by closing the initial soon-to-expire contract and opening a longer-term contract for the same underlying tradeable object. The roll to contract having a more distant expiration date (e.g., next month) maintains the tradeable object beyond the expiration of the initial contract and is typically executed before the expiration of the initial soon-to-expire contract.

A contract roll may be further achieved selecting the element representing the tradeable object. Selection (a click or double click) of the tradeable object element can cause all of the trading strategies connected to the element via the flexible connector to shift or roll to the next contract node and contract expiration date, for example.

Some of the described figures depict example block diagrams, systems, and/or flow diagrams representative of methods that may be used to implement all or part of certain embodiments. One or more of the components, elements, blocks, and/or functionality of the example block diagrams, systems, and/or flow diagrams may be implemented alone or in combination in hardware, firmware, discrete logic, as a set of computer readable instructions stored on a tangible computer readable medium, and/or any combinations thereof, for example.

The example block diagrams, systems, and/or flow diagrams may be implemented using any combination of application specific integrated circuit(s) (ASIC(s)), programmable logic device(s) (PLD(s)), field programmable logic device(s) (FPLD(s)), discrete logic, hardware, and/or firmware, for example. Also, some or all of the example methods may be implemented manually or in combination with the foregoing techniques, for example.

The example block diagrams, systems, and/or flow diagrams may be performed using one or more processors, controllers, and/or other processing devices, for example. For example, the examples may be implemented using coded instructions, for example, computer readable instructions, stored on a tangible computer readable medium. A tangible computer readable medium may include various types of volatile and non-volatile storage media, including, for example, random access memory (RAM), read-only memory (ROM), programmable read-only memory (PROM), electrically programmable read-only memory (EPROM), electrically erasable read-only memory (EEPROM), flash memory, a hard disk drive, optical media, magnetic tape, a file server, any other tangible data storage device, or any combination thereof. The tangible computer readable medium is non-transitory.

Further, although the example block diagrams, systems, and/or flow diagrams are described above with reference to the figures, other implementations may be employed. For example, the order of execution of the components, elements, blocks, and/or functionality may be changed and/or some of the components, elements, blocks, and/or functionality described may be changed, eliminated, sub-divided, or combined. Additionally, any or all of the components, elements, blocks, and/or functionality may be performed sequentially and/or in parallel by, for example, separate processing threads, processors, devices, discrete logic, and/or circuits.

While embodiments have been disclosed, various changes may be made and equivalents may be substituted. In addition, many modifications may be made to adapt a particular situation or material. Therefore, it is intended that the disclosed technology not be limited to the particular embodiments disclosed, but will include all embodiments falling within the scope of the appended claims.

The invention claimed is:

1. A non-transitory computer readable medium having stored therein instructions executable by a processor, including instructions executable to:
   provide a user interface in a display of a computing device, wherein the user interface depicts a strategy node, a first contract node of a plurality of contract nodes and a second contract nodes of the plurality of contract nodes, wherein the strategy node corresponds to a trading strategy having a strategy definition, and wherein each of the plurality of contract nodes represents a contract associated with a tradeable object;
   in response to an input detected via the user interface, connect the strategy node to the first contract node using a graphical connector displayed by the user interface, wherein the connection reflects the strategy definition;
   subsequent to connecting the strategy node to the first contract node, roll the contract by repositioning the graphical connector from the first contract node to the second contract node such that the second contract node is visually connected the strategy node;
   in response to the repositioning of the graphical connector, generate an updated strategy definition for the trading strategy by changing a first tradeable object associated with the first contract node to a second tradeable object associated with the second contract node; and
   automatically executing the updated strategy definition at an exchange.

2. The non-transitory computer readable medium of claim 1 further including instructions executable to: communicate the updated trading strategy definition to a trading device.

3. The non-transitory computer readable medium of claim 1, wherein the trading strategy includes a spread trading strategy including a first leg and a second leg.

4. The non-transitory computer readable medium of claim 1, wherein the input includes a click or a double click.

5. The non-transitory computer readable medium of claim 1, wherein the input includes a drag and drop action.

6. The non-transitory computer readable medium of claim 1, wherein the contract represented by the second contract node is of a same type as the contract represented by the first contract node.

7. The non-transitory computer readable medium of claim 1, wherein the contract represented by the second contract node is of a different type than the contract represented by the first contract node.

8. The non-transitory computer readable medium of claim 1, wherein the contract represented by the second contract node has a later expiration date than the contract represented by the first contract node.

9. The non-transitory computer readable medium of claim 1, wherein the graphical connector includes a first endpoint coupled to the strategy node and a second end point coupled to the first contract node.

10. The non-transitory computer readable medium of claim 9, wherein selection of the second endpoint causes the graphical connector to flexibly deform as the second end point moves from the first contract node to the second contact node.

11. The non-transitory computer readable medium of claim 1, wherein the display of the computing device is a touchscreen display configured to provide the user interface and detect an input.

12. The non-transitory computer readable medium of claim 1, further including instructions executable to: display a second strategy node in the user interface, wherein the second strategy node represents a second trading strategy defined by a second strategy definition, wherein the second strategy definition specifies a relationship between the first tradeable object and a third tradeable object; in response to a second input detected via the user interface, connect the second strategy node to the first contract node using a second graphical connector displayed by the user interface, wherein the connection reflects the second strategy definition.

13. The non-transitory computer readable medium of claim 12 further including instructions executable to: subsequent to connecting the second strategy node to the first contract node, roll the contract by repositioning the second graphical connector from the first contract node to the second contract node such that the second contract node is visually connected the second strategy node.

14. The non-transitory computer readable medium of claim 13 further including instructions executable to: in response to the repositioning of the graphical connector, generate an updated second strategy definition for the trading strategy by changing the first tradeable object associated with the first contract node to the second tradeable object associated with the second contract node.

* * * * *